(12) United States Patent
Cortes et al.

(10) Patent No.: US 10,812,606 B2
(45) Date of Patent: Oct. 20, 2020

(54) SUPPORTING COMMUNICATIONS IN A STREAM PROCESSING PLATFORM

(71) Applicant: Nokia Solutions and Networks Oy, Espoo (FI)

(72) Inventors: Mauricio Cortes, Scotch Plains, NJ (US); Adriaan de Lind van Wijngaarden, Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 128 days.

(21) Appl. No.: 16/114,853

(22) Filed: Aug. 28, 2018

(65) Prior Publication Data

US 2020/0076912 A1   Mar. 5, 2020

(51) Int. Cl.
*H04L 29/08* (2006.01)
*G06F 9/54* (2006.01)
*H04L 12/24* (2006.01)

(52) U.S. Cl.
CPC .............. *H04L 67/26* (2013.01); *G06F 9/544* (2013.01); *G06F 9/546* (2013.01); *H04L 41/5054* (2013.01); *H04L 67/16* (2013.01)

(58) Field of Classification Search
None
See application file for complete search history.

(56) References Cited

U.S. PATENT DOCUMENTS 7,120,112 B1 * 10/2006 Metzger .................... H04J 3/14
370/219

8,060,614 B2 * 11/2011 Goldstein ............. G06F 9/5083
709/226

(Continued)

OTHER PUBLICATIONS

Amini, et al, "SPC: A Distributed, Scalable Platform for Data Mining," Proc. Int'l Workshop on Data Mining Standards, Services and Platforms, Philadelphia, PA, Aug. 2006, pp. 27-37.

(Continued)

*Primary Examiner* — Thomas J Dailey
(74) *Attorney, Agent, or Firm* — Tong, Rea, Bentley & Kim, LLC

(57) ABSTRACT

Various example embodiments for supporting communications for stream processing platforms are described. Various example embodiments for supporting communications in a stream processing platform may be configured to use micro-brokers to support communications in a stream processing platform by providing micro-brokers configured to support communications between operators of operator groups of the stream processing platform. Various example embodiments for supporting communications in a stream processing platform may be configured to use micro-brokers to support communications in the stream processing platform by providing micro-brokers configured to support communications between operators of operator groups of the stream processing platform using various communication modes (e.g., shared queues for communications between operators of the same operator group, shared memory of a host computer for communications between operators of different operator groups in the same host computer, point-to-point connections or message brokers for communications between operators in different host computers, or the like) based on various considerations.

19 Claims, 17 Drawing Sheets

(56) References Cited

U.S. PATENT DOCUMENTS

| | | | |
|---|---|---|---|
| 8,290,939 B2* | 10/2012 | Bouillet | G06F 16/24568 707/722 |
| 8,380,965 B2 | 2/2013 | Bouillet et al. | |
| 9,087,082 B2 | 7/2015 | Branson et al. | |
| 9,148,495 B2 | 9/2015 | Cradick et al. | |
| 9,473,550 B2 | 10/2016 | Branson et al. | |
| 9,756,084 B2* | 9/2017 | Olivier | H04L 69/40 |
| 10,091,130 B2* | 10/2018 | Cook | H04L 65/60 |
| 10,516,729 B2* | 12/2019 | Crawford | H04L 41/5025 |
| 2011/0083046 A1 | 4/2011 | Andrade et al. | |
| 2014/0122557 A1* | 5/2014 | Branson | H04L 67/02 709/201 |
| 2014/0244554 A1* | 8/2014 | Atasu | G06F 9/4498 706/12 |
| 2015/0207749 A1* | 7/2015 | Cao | G06F 16/24568 709/226 |
| 2015/0310389 A1 | 10/2015 | Crimm et al. | |
| 2016/0328450 A1* | 11/2016 | Branson | G06F 16/24568 |

OTHER PUBLICATIONS

Amazon, "AWS Greengrass—Developer's Guide," downloaded from https://docs.aws.amazon.com/greengrass/latest/developerguide/gg-dg.pdf, printed on Sep. 14, 2018.

Cugola, et al., "Processing Flows of Information: From Data Stream to Complex Event Processing," ACM Computer Surveys, vol. 44, No. 3, Article 15, Jun. 2012, pp. 1-62.

Gedik, et al., "SPADE: The System S Declarative Stream Processing Engine," Proc. ACM SIGMOD Int't Conference on Management of Data, Vancouver, Canada, Jun. 2008, pp. 1123-1134.

Hirzel, et al., "Streams that Compose using Macros that Oblige," Proc. Workshop on Partial Evaluation and Program Evaluation, Philadelphia, PA, Jan. 2012, pp. 141-150.

Toshniwal, et al., "Storm@twitter," Proc. ACM SIGMOD Int'l Conf. on Management of Data, Snowbird, UT, Jun. 2014, pp. 147-156.

* cited by examiner

SUPPORTING COMMUNICATIONS IN A STREAM PROCESSING PLATFORM

TECHNICAL FIELD

Various example embodiments relate generally to data processing and, more particularly but not exclusively, to controlling communication of data messages from suppliers of data messages to consumers of data messages for supporting data processing in stream processing platforms.

BACKGROUND

Data processing systems often organize the transfer of data from an information producer to one or several information consumers as a stream of data messages. An information producer may provide one or more data streams. An information consumer may process one or more data streams and may, in turn, supply zero or more data streams. A data processing system that supports data stream processing in a concurrent system, such as a multi-core computer or a networked system of computers, is, in general terms, referred to as a stream processing platform. Stream processing platforms generally support real-time processing of data and may be used in various contexts for various types of applications.

SUMMARY

Various example embodiments relate generally to supporting communications of data in a stream processing platform.

Various example embodiments for supporting communications in a stream processing platform may be configured to use brokers to support communications in a stream processing platform. In general, a broker, such as a message broker or a micro-broker, may be configured to support communications in a stream processing platform. Various example embodiments for supporting communications in a stream processing platform may be configured to use micro-brokers to support communications in a stream processing platform by providing micro-brokers configured to support communications between operators of operator groups of the stream processing platform.

In at least some example embodiments, an apparatus includes at least one processor and at least one memory including computer program code, wherein the at least one memory and the computer program code are configured to, with the at least one processor, cause the apparatus to at least determine, by a micro-broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform and support, by the micro-broker based on the communication mode, communication of the data of the data stream between the first operator and the second operator. In at least some example embodiments, the communication mode includes one of a shared queue, a shared memory, a point-to-point connection, or a message broker. In at least some example embodiments, the first operator and the second operator are co-located within the operator group, wherein the communication mode includes a shared queue of the micro-broker. In at least some example embodiments, the operator group is hosted on a host computer, wherein the first operator is located within the operator group and the second operator is located within a second operator group hosted on the host computer, wherein the communication mode includes a shared memory of the host computer. In at least some example embodiments, the operator group is hosted on a host computer, wherein the first operator is located within the operator group, wherein the second operator is located within the operator group or located within a second operator group hosted on the host computer, wherein the communication mode includes a communication mode that does not use a transport layer of a communication stack of the host computer. In at least some example embodiments, the operator group is hosted on a host computer, wherein the first operator is located within the operator group and the second operator is located within a second operator group hosted on a second host computer, wherein the communication mode includes a point-to-point connection or a connection with a message broker. In at least some example embodiments, the communication mode is further based on a popularity of the data stream. In at least some example embodiments, the communication mode is a point-to-point connection when the popularity of the data stream fails to satisfy a popularity threshold. In at least some example embodiments, the communication mode is a connection with a message broker when the popularity of the data stream satisfies a popularity threshold. In at least some example embodiments, to determine the communication mode, the at least one memory and the computer program code are configured to, with the at least one processor, cause the apparatus to at least receive, by the micro-broker from a platform controller of the stream processing platform, an instruction associated with the data stream and determine, by the micro-broker based on the instruction associated with the data stream, the communication mode for communication of the data of the data stream. In at least some example embodiments, to determine the communication mode, the at least one memory and the computer program code are configured to, with the at least one processor, cause the apparatus to at least determine, by the micro-broker based on communications by the micro-broker with at least one other micro-broker, information indicative of network quality and determine, by the micro-broker based on the information indicative of network quality, the communication mode for communication of the data of the data stream. In at least some example embodiments, to determine the communication mode, the at least one memory and the computer program code are configured to, with the at least one processor, cause the apparatus to at least determine, by the micro-broker additional information including at least one of a characteristic of the data stream, a characteristic the first operator, a characteristic of the second operator, or a system constraint of the stream processing platform and determine, by the micro-broker based on the additional information, the communication mode for communication of the data of the data stream. In at least some example embodiments, to support communication of data of the data stream between the first operator and the second operator, the at least one memory and the computer program code are configured to, with the at least one processor, cause the apparatus to at least send the data of the data stream based on the communication mode or receive the data of the data stream based on the communication mode. In at least some example embodiments, to support communication of data of the data stream between the first operator and the second operator, the at least one memory and the computer program code are configured to, with the at least one processor, cause the apparatus to at least support a finite state machine configured to control a communication state of the first operator of the stream processing platform. In at least some example embodiments, the at least one memory and the computer program code are configured to, with the at least one processor, cause the apparatus to at least support establishment of point-to-point communications based on a communications protocol, wherein the communications protocol is optimized for the point-to-point communications. In at least some example embodiments, the at least one memory and the computer program code are configured to, with the at least one processor, cause the apparatus to at least determine, by the micro-broker, a second communication mode for communication of the data of the data stream between the first operator and a third operator of the stream processing platform, wherein the communication mode and the second communication mode are different and support, by the micro-broker based on the second communication mode, communication of the data of the data stream between the first operator and the third operator. In at least some example embodiments, the at least one memory and the computer program code are configured to, with the at least one processor, cause the apparatus to at least support an application programming interface configured to support communication between the micro-broker and a platform controller of the stream processing platform. In at least some example embodiments, the at least one memory and the computer program code are configured to, with the at least one processor, cause the apparatus to at least support an application programming interface configured to support communication between the micro-broker and a second micro-broker associated with a second operator group including the second operator.

In at least some example embodiments, a method includes determining, by a micro-broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform and supporting, by the micro-broker based on the communication mode, communication of the data of the data stream between the first operator and the second operator. In at least some example embodiments, the communication mode includes one of a shared queue, a shared memory, a point-to-point connection, or a message broker. In at least some example embodiments, the first operator and the second operator are co-located within the operator group, wherein the communication mode includes a shared queue of the micro-broker. In at least some example embodiments, the operator group is hosted on a host computer, wherein the first operator is located within the operator group and the second operator is located within a second operator group hosted on the host computer, wherein the communication mode includes a shared memory of the host computer. In at least some example embodiments, the operator group is hosted on a host computer, wherein the first operator is located within the operator group, wherein the second operator is located within the operator group or located within a second operator group hosted on the host computer, wherein the communication mode includes a communication mode that does not use a transport layer of a communication stack of the host computer. In at least some example embodiments, the operator group is hosted on a host computer, wherein the first operator is located within the operator group and the second operator is located within a second operator group hosted on a second host computer, wherein the communication mode includes a point-to-point connection or a connection with a message broker. In at least some example embodiments, the communication mode is further based on a popularity of the data stream. In at least some example embodiments, the communication mode is a point-to-point connection when the popularity of the data stream fails to satisfy a popularity threshold. In at least some example embodiments, the communication mode is a connection with a message broker when the popularity of the data stream satisfies a popularity threshold. In at least some example embodiments, determining the communication mode includes receiving, by the micro-broker from a platform controller of the stream processing platform, an instruction associated with the data stream and determining, by the micro-broker based on the instruction associated with the data stream, the communication mode for communication of the data of the data stream. In at least some example embodiments, determining the communication mode includes determining, by the micro-broker based on communications by the micro-broker with at least one other micro-broker, information indicative of network quality and determining, by the micro-broker based on the information indicative of network quality, the communication mode for communication of the data of the data stream. In at least some example embodiments, determining the communication mode includes determining, by the micro-broker, additional information including at least one of a characteristic of the data stream, a characteristic the first operator, a characteristic of the second operator, or a system constraint of the stream processing platform and determining, by the micro-broker based on the additional information, the communication mode for communication of the data of the data stream. In at least some example embodiments, supporting communication of data of the data stream between the first operator and the second operator includes sending the data of the data stream based on the communication mode or receiving the data of the data stream based on the communication mode. In at least some example embodiments, supporting communication of data of the data stream between the first operator and the second operator includes supporting a finite state machine configured to control a communication state of the first operator of the stream processing platform. In at least some example embodiments, the method includes supporting establishment of point-to-point communications based on a communications protocol, wherein the communications protocol is optimized for the point-to-point communications. In at least some example embodiments, the method includes determining, by the micro-broker, a second communication mode for communication of the data of the data stream between the first operator and a third operator of the stream processing platform, wherein the communication mode and the second communication mode are different and supporting, by the micro-broker based on the second communication mode, communication of the data of the data stream between the first operator and the third operator. In at least some example embodiments, the method includes supporting an application programming interface configured to support communication between the micro-broker and a platform controller of the stream processing platform. In at least some example embodiments, the method includes supporting an application programming interface configured to support communication between the micro-broker and a second micro-broker associated with a second operator group including the second operator.

In at least some example embodiments, a non-transitory computer readable medium includes program instructions for causing an apparatus to at least determine, by a micro-broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform and support, by the micro-broker based on the communication mode, communication of the data of the data stream between the first operator and the second operator. In at least some example embodiments, the communication mode includes one of a shared queue, a shared memory, a point-to-point connection, or a message broker. In at least some example embodiments, the first operator and the second operator are co-located within the operator group, wherein the communication mode includes a shared queue of the micro-broker. In at least some example embodiments, the operator group is hosted on a host computer, wherein the first operator is located within the operator group and the second operator is located within a second operator group hosted on the host computer, wherein the communication mode includes a shared memory of the host computer. In at least some example embodiments, the operator group is hosted on a host computer, wherein the first operator is located within the operator group, wherein the second operator is located within the operator group or located within a second operator group hosted on the host computer, wherein the communication mode includes a communication mode that does not use a transport layer of a communication stack of the host computer. In at least some example embodiments, the operator group is hosted on a host computer, wherein the first operator is located within the operator group and the second operator is located within a second operator group hosted on a second host computer, wherein the communication mode includes a point-to-point connection or a connection with a message broker. In at least some example embodiments, the communication mode is further based on a popularity of the data stream. In at least some example embodiments, the communication mode is a point-to-point connection when the popularity of the data stream fails to satisfy a popularity threshold. In at least some example embodiments, the communication mode is a connection with a message broker when the popularity of the data stream satisfies a popularity threshold. In at least some example embodiments, to determine the communication mode, the non-transitory computer-readable medium includes program instructions for causing the apparatus to at least receive, by the micro-broker from a platform controller of the stream processing platform, an instruction associated with the data stream and determine, by the micro-broker based on the instruction associated with the data stream, the communication mode for communication of the data of the data stream. In at least some example embodiments, to determine the communication mode, the non-transitory computer-readable medium includes program instructions for causing the apparatus to at least determine, by the micro-broker based on communications by the micro-broker with at least one other micro-broker, information indicative of network quality and determine, by the micro-broker based on the information indicative of network quality, the communication mode for communication of the data of the data stream. In at least some example embodiments, to determine the communication mode, the non-transitory computer-readable medium includes program instructions for causing the apparatus to at least determine, by the micro-broker, additional information including at least one of a characteristic of the data stream, a characteristic the first operator, a characteristic of the second operator, or a system constraint of the stream processing platform and determine, by the micro-broker based on the additional information, the communication mode for communication of the data of the data stream. In at least some example embodiments, to support communication of data of the data stream between the first operator and the second operator, the non-transitory computer-readable medium includes program instructions for causing the apparatus to at least send the data of the data stream based on the communication mode or receive the data of the data stream based on the communication mode. In at least some example embodiments, to support communication of data of the data stream between the first operator and the second operator, the non-transitory computer-readable medium includes program instructions for causing the apparatus to at least support a finite state machine configured to control a communication state of the first operator of the stream processing platform. In at least some example embodiments, the non-transitory computer-readable medium includes program instructions for causing the apparatus to at least support establishment of point-to-point communications based on a communications protocol, wherein the communications protocol is optimized for the point-to-point communications. In at least some example embodiments, the non-transitory computer-readable medium includes program instructions for causing the apparatus to at least determine, by the micro-broker, a second communication mode for communication of the data of the data stream between the first operator and a third operator of the stream processing platform, wherein the communication mode and the second communication mode are different and support, by the micro-broker based on the second communication mode, communication of the data of the data stream between the first operator and the third operator. In at least some example embodiments, the non-transitory computer-readable medium includes program instructions for causing the apparatus to at least support an application programming interface configured to support communication between the micro-broker and a platform controller of the stream processing platform. In at least some example embodiments, the non-transitory computer-readable medium includes program instructions for causing the apparatus to at least support an application programming interface configured to support communication between the micro-broker and a second micro-broker associated with a second operator group including the second operator.

In at least some example embodiments, an apparatus includes means for determining, by a micro-broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform and means for supporting, by the micro-broker based on the communication mode, communication of the data of the data stream between the first operator and the second operator. In at least some example embodiments, the communication mode includes one of a shared queue, a shared memory, a point-to-point connection, or a message broker. In at least some example embodiments, the first operator and the second operator are co-located within the operator group, wherein the communication mode includes a shared queue of the micro-broker. In at least some example embodiments, the operator group is hosted on a host computer, wherein the first operator is located within the operator group and the second operator is located within a second operator group hosted on the host computer, wherein the communication mode includes a shared memory of the host computer. In at least some example embodiments, the operator group is hosted on a host computer, wherein the first operator is located within the operator group, wherein the second operator is located within the operator group or located within a second operator group hosted on the host computer, wherein the communication mode includes a communication mode that does not use a transport layer of a communication stack of the host computer. In at least some example embodiments, the operator group is hosted on a host computer, wherein the first operator is located within the operator group and the second operator is located within a second operator group hosted on a second host computer, wherein the communication mode includes a point-to-point connection or a connection with a message broker. In at least some example embodiments, the communication mode is further based on a popularity of the data stream. In at least some example embodiments, the communication mode is a point-to-point connection when the popularity of the data stream fails to satisfy a popularity threshold. In at least some example embodiments, the communication mode is a connection with a message broker when the popularity of the data stream satisfies a popularity threshold. In at least some example embodiments, the means for determining the communication mode includes means for receiving, by the micro-broker from a platform controller of the stream processing platform, an instruction associated with the data stream and means for determining, by the micro-broker based on the instruction associated with the data stream, the communication mode for communication of the data of the data stream. In at least some example embodiments, the means for determining the communication mode includes means for determining, by the micro-broker based on communications by the micro-broker with at least one other micro-broker, information indicative of network quality and means for determining, by the micro-broker based on the information indicative of network quality, the communication mode for communication of the data of the data stream. In at least some example embodiments, the means for determining the communication mode includes means for determining, by the micro-broker, additional information including at least one of a characteristic of the data stream, a characteristic the first operator, a characteristic of the second operator, or a system constraint of the stream processing platform and means for determining, by the micro-broker based on the additional information, the communication mode for communication of the data of the data stream. In at least some example embodiments, the means for supporting communication of data of the data stream between the first operator and the second operator includes means for sending the data of the data stream based on the communication mode or receiving the data of the data stream based on the communication mode. In at least some example embodiments, the means for supporting communication of data of the data stream between the first operator and the second operator includes means for supporting a finite state machine configured to control a communication state of the first operator of the stream processing platform. In at least some example embodiments, the apparatus includes means for supporting establishment of point-to-point communications based on a communications protocol, wherein the communications protocol is optimized for the point-to-point communications. In at least some example embodiments, the apparatus includes means for determining, by the micro-broker, a second communication mode for communication of the data of the data stream between the first operator and a third operator of the stream processing platform, wherein the communication mode and the second communication mode are different and supporting, by the micro-broker based on the second communication mode, communication of the data of the data stream between the first operator and the third operator. In at least some example embodiments, the apparatus includes means for supporting an application programming interface configured to support communication between the micro-broker and a platform controller of the stream processing platform. In at least some example embodiments, the apparatus includes means for supporting an application programming interface configured to support communication between the micro-broker and a second micro-broker associated with a second operator group including the second operator.

In at least some example embodiments, an apparatus includes at least one processor and at least one memory including computer program code, wherein the at least one memory and the computer program code are configured to, with the at least one processor, cause the apparatus to at least determine, by a controller of a stream processing platform, a status of a data stream to be processed by an operator of an operator group of the stream processing platform and send, by the controller of the stream processing platform toward a micro-broker associated with the operator group of the data stream based on the status of the data stream, a command configured to control determination, by the micro-broker, of a communication mode for the data stream to be communicated by the first operator toward the second operator.

In at least some example embodiments, a method includes determining, by a controller of a stream processing platform, a status of a data stream to be processed by an operator of an operator group of the stream processing platform and sending, by the controller of the stream processing platform toward a micro-broker associated with the operator group of the data stream based on the status of the data stream, a command configured to control determination, by the micro-broker, of a communication mode for the data stream to be communicated by the first operator toward the second operator.

In at least some example embodiments, a non-transitory computer readable medium includes program instructions for causing an apparatus to at least determine, by a controller of a stream processing platform, a status of a data stream to be processed by an operator of an operator group of the stream processing platform and send, by the controller of the stream processing platform toward a micro-broker associated with the operator group of the data stream based on the status of the data stream, a command configured to control determination, by the micro-broker, of a communication mode for the data stream to be communicated by the first operator toward the second operator.

In at least some example embodiments, an apparatus includes means for determining, by a controller of a stream processing platform, a status of a data stream to be processed by an operator of an operator group of the stream processing platform and means for sending, by the controller of the stream processing platform toward a micro-broker associated with the operator group of the data stream based on the status of the data stream, a command configured to control determination, by the micro-broker, of a communication mode for the data stream to be communicated by the first operator toward the second operator.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
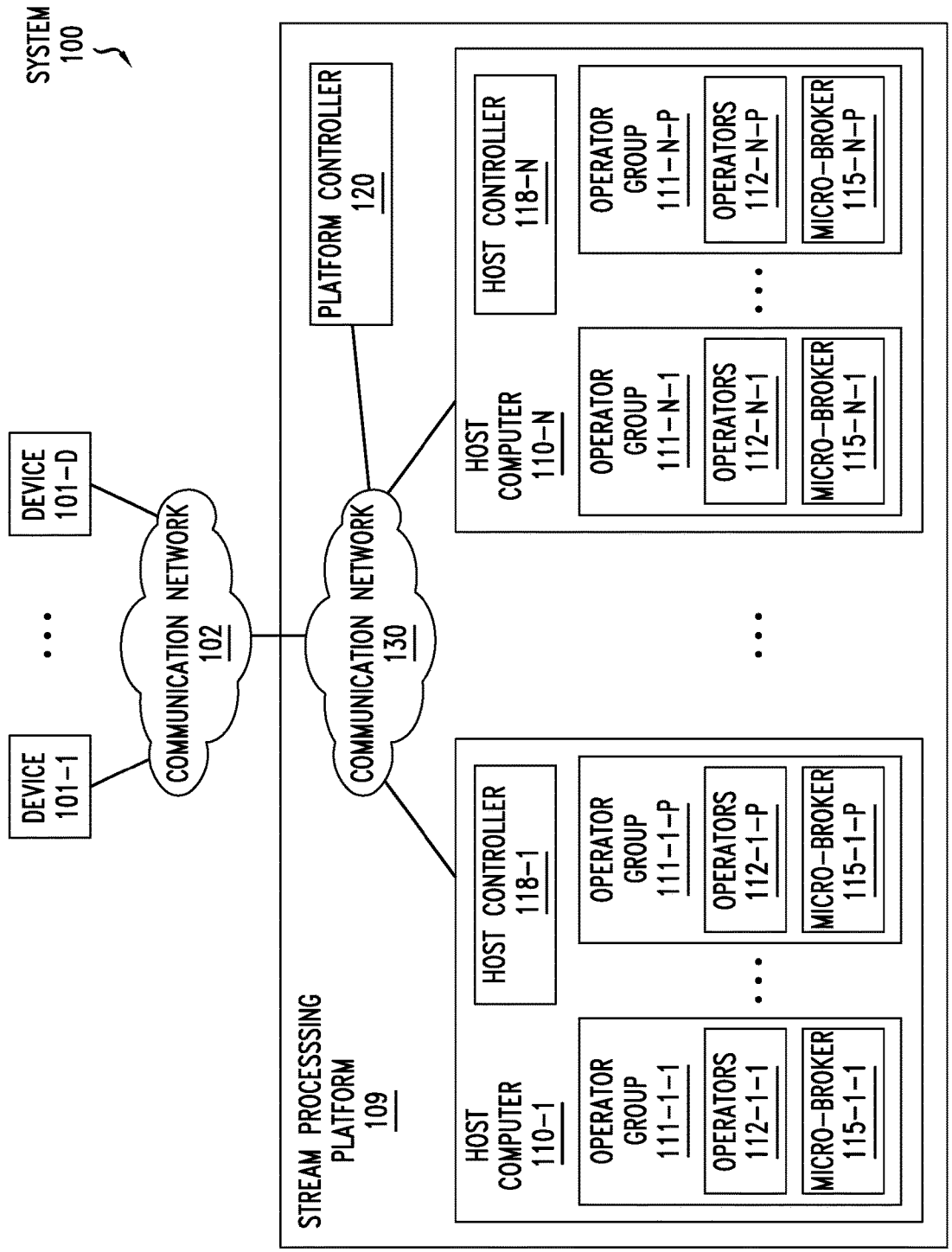
FIG. 1 depicts an example embodiment of a system including a stream processing platform.

Various example embodiments for supporting communications in a stream processing platform are described herein.

The following abbreviations are herewith expanded, at least some of which are referred to within the following description.

AMQP Advanced Message Queuing Protocol
CPU Central Processing Unit
GPU Graphics Processing Unit
IoT Internet-of-Things
IP Internet Protocol
MAC Media Access Control
MQTT Message Queuing Telemetry Transport
OSI Open Systems Interconnection
STOMP Simple Text Oriented Message Protocol
TCP Transmission Control Protocol
UDP User Datagram Protocol
ZMQ Zero Message-Queue Various example embodiments for supporting communications in a stream processing platform may be configured to use brokers to support communications in a stream processing. In general, a broker, such as a message broker or a micro-broker, may be configured to support communications in a stream processing platform. Various example embodiments for supporting communications in a stream processing platform may be configured to use micro-brokers to support communications in a stream processing platform by providing micro-brokers configured to support communications between operators of operator groups of the stream processing platform. Various example embodiments for supporting communications in a stream processing platform may be configured to support communications of a stream of data messages, which also may be referred to herein as supporting communication of a data stream. Various example embodiments for supporting communications in a stream processing platform may be configured to support communication of data streams for operators of the stream processing platform. Various example embodiments for supporting communications in a stream processing platform may be configured to support communications in a stream processing platform in which operators of the stream processing platform are grouped into one or more operator groups which run in one or more host computers (e.g., each operator group runs on a host computer and each host computer can support one or more operator groups). Various example embodiments for supporting communications in a stream processing platform may be configured to use micro-brokers to support communications in the stream processing platform. Various example embodiments for supporting communications in a stream processing platform may be configured to use micro-brokers to support communications in a stream processing platform by configuring micro-brokers to support communications between operators of operator groups of the stream processing platform. Various example embodiments for supporting communications in a stream processing platform may be configured to use micro-brokers to support communications in the stream processing platform by configuring micro-brokers to support communications between operators of operator groups of the stream processing platform using various communication modes (e.g., shared queues of micro-brokers for communications between operators of the same operator group (e.g., where a shared queue of a micro-broker may be a shared queue allocated and maintained by the micro-broker), shared memory of a host computer for communications between operators of different operator groups in the same host computer (e.g., where a shared memory of a host computer may be part of the memory resources of the host computer), point-to-point connections or message brokers for communications between operators of different operator groups in different host computers, or the like, as well as various combinations thereof). Various example embodiments for supporting communications in a stream processing platform may be configured to use micro-brokers to support communications in the stream processing platform by configuring micro-brokers to support communications between operators of operator groups of the stream processing platform based on various considerations, such as locations of the operators relative to each other (e.g., within the same operator group, within different operator groups in the same host computer, within different host computers, or the like), operator characteristics, stream characteristics, system constraints (e.g., resource availability, latency, computational overhead, resiliency, security, scalability, priority handling, failure handling, or the like), system conditions (e.g., traffic load, failure conditions, or the like), or the like, as well as various combinations thereof. Various example embodiments for supporting communications in a stream processing platform may be configured to use micro-brokers to support communications in the stream processing platform by configuring micro-brokers to support communications of different data streams of the stream processing platform in a manner, based on stream popularity, that accounts for a power-law distribution of the data streams in which it is expected that a relatively large number of streams will be processed by a handful of operators (e.g., using a message broker communication mode for relatively popular streams, where the overhead of the message broker may be tolerated for a relatively small number of streams as message brokers are typically optimized to clone messages at high rates) while a relatively small number of streams will be processed by a large number of operators (e.g., using relatively localized communication modes or point-to-point communication modes for relatively unpopular streams at the long tail of the streams distribution). Various example embodiments for supporting communications in a stream processing platform may be configured to use micro-brokers to support communications in the stream processing platform by configuring micro-brokers to support communications between operators of operator groups of the stream processing platform and one or more devices external to the stream processing platform (e.g., one or more external sources, one or more external sinks, or a combination thereof). It will be appreciated that these and various other example embodiments and advantages or potential advantages for supporting communications in stream processing platforms may be further understood by way of reference to the various figures, which are discussed further below.

FIG. 1 depicts an example embodiment of a system including a stream processing platform.

The system 100 includes a set of devices 101, a communication network 102, and a stream processing platform 109.

The devices 101 may include any devices external to stream processing platform (and, thus, also may be referred to herein as external devices). The devices 101 may be configured to operate as sources and/or sinks of data streams which may be processed by stream processing platform 109 (and, thus, within various contexts, may be referred to as source devices or sink devices). The devices 101 may be configured to support communication of data streams for various applications for which stream processing platform 109 may provide stream processing (e.g., telecommunications applications, media publishing applications, Internet-of-Things (IoT) applications, or the like, as well as various combinations thereof). For example, the devices 101 may include endpoint devices (e.g., computers, smartphones, televisions, Internet-of-Things devices, or the like), network devices (e.g., routers, servers, or the like), or the like. The devices 101 may include any types of devices which may operate as sources and/or sinks of data streams which may be handled by stream processing platform 109.

The communication network 102 is configured to support communications of the devices 101 and the stream processing platform 109, which may include direct communications between devices 101 independent of stream processing platform 109, communications between devices 101 via stream processing platform 109, communications with other devices (omitted for purposes of clarity, where such communications may be independent of or via stream processing platform 109), or the like, as well as various combinations thereof. The communication network 102 may include any suitable communications technologies configured to support communications of data streams as discussed herein.

The stream processing platform 109 may be a stream processing platform which may support data stream processing for various applications. For example, the stream processing platform 109 may support data stream processing for telecommunications applications, media publishing applications, Internet-of-Things applications, or the like, as well as various combinations thereof. It will be appreciated that stream processing platform 109 may be used to support data stream processing for various other applications or contexts.

The stream processing platform 109 includes a set of host computers 110-1-110-N (collectively, host computers 110) and a platform controller 120.

The host computers 110 may include any computers configured to support stream processing functions of the stream processing platform 109. The host computers 110 may be composed of various elements which, as discussed further herein, may include various hardware elements, software elements, firmware elements, or the like, as well as various combinations thereof. The host computers 110 may reside in one or more locations (e.g., within a single data center or location, distributed across multiple data centers or locations, or the like).

The host computers 110, as noted above, may be composed of various hardware elements, such as processors (e.g., central processing units (CPUs), graphics processing units (GPUs), or the like), various external components (e.g., main memory, input-output (I/O) circuitry, or the like), or the like, as well as various combinations thereof. In general, a processor may be considered to include electronic circuitry within a computer that carries out the instructions of a computer program by performing the basic operations (e.g., arithmetic, logical, control, I/O, or the like) specified by the instructions. It will be appreciated that the term "processor" traditionally refers to the processing unit and control unit of the processor, distinguishing these core elements of a computer from external components such as main memory and I/O circuitry.

The host computers 110 may be configured to execute computer programs (or, more simply, programs), where a computer program may be considered to be a structured collection of instruction sequences that perform a specific task or tasks when executed by a computer.

The host computers 110 may be configured to support processes and associated process groups. In general, a process is an instance of a computer program that is being executed and may be considered to include the program code and its current activity. It is noted that, depending on the operating system (OS), a process may be made up of multiple threads of execution that execute instructions concurrently. In general, a process group refers to a collection of one or more processes. It is noted, among other things, that a process group may be used to control the distribution of a signal (e.g., when a signal is directed to a process group, the signal is delivered to each process that is a member of the process group).

The host computers 110 may be configured to support operators and associated operator groups. The operators are configured to support various stream processing functions for data streams of the stream processing platform 109. In general, an operator is software, controlled and executed by an operator group, that handles at least one stream (e.g., taking zero or more input streams as input and producing one or more output streams as output or taking one or more input streams as input and producing zero or more output streams as output). In general, an operator group denotes a collection of one or more operators that are handled by a process group and, thus, an operator may be considered to be a process (e.g., at least from an OS perspective).

The host computers 110 may be configured to support handling of various types of data streams. In general, a data stream (or stream) is a sequence of data elements that is made available over time. A data stream may have an associated stream source (or source) which is a device or operator that generates a sequence of data elements that constitute a stream (e.g., providing the elements of the stream as output) and an associated stream sink (or sink) which is a device or an operator within the stream processing platform 109 that consumes a sequence of data elements that constitute a stream (e.g., taking the elements of the stream as input). The streams may include single source-single sink streams which are streams generated by one source and consumed by one sink (e.g., a point-to-point video link, a point-to-point audio link, or the like), single-source multi-sink streams which are streams generated by one source and consumed by two or more sinks (e.g., a video broadcast, a subscription to a news feed, or the like), multi-source single-sink streams which are streams that are generated by two or more sources and consumed by one sink (e.g., a system that collects information from multiple sensors using a multiple-access system with a single receiver may compound the information into a single stream to be provided to a server or other device), multi-source multi-sink streams which are streams that are generated by two or more sources and consumed by two or more sinks (e.g., a system that collects information from multiple sensors using a multiple-access system with a single receiver may compound the information into a single stream to be provided to multiple intended destination devices), or the like. The streams may include time-dependent streams, time-independent streams, uniform streams, bursty streams, structured streams, unstructured streams, sparse streams, dense streams, or the like, as well as various combinations thereof.

The host computers 110, as indicated above, may be configured to support operators configured to support stream processing for the stream processing platform. The host computers 110 each host a respective set of one or more operator groups 111 (illustratively, host computer 110-1 hosts a set of operator groups 111-1-1-111-1-P and host computer 110-N hosts a set of operator groups 111-N-1-111-N-P). The operator groups 111 each include a respective set of one or more operators 112 (illustratively, operator group 111-1-1 includes a set of operators 112-1-1, operator group 111-1-P includes a set of operators 112-1-P, operator group 111-N-1 includes a set of operators 112-N-1, and operator group 111-N-P includes a set of operators 112-N-P). The operator groups 111 each have a respective micro-broker (micro-broker) 115 associated therewith (illustratively, operator groups 111-1-1-111-1-P include micro-brokers 115-1-1-115-1-P and operator groups 111-N-1-111-N-P include micro-brokers 115-N-P-115-N-P associated therewith, respectively). It will be appreciated that "P" may be different for different host computers 110 (i.e., different host computers 110 may include different numbers of operator groups 111). The host computers 110 each include a host controller 118 (illustratively, host computers 110-1-110-N include host controllers 118-1-118-N, respectively). The host computers 110 are communicatively connected with each other and with the platform controller 120 via a communication network 130, which may be any suitable underlying communication network configured to support communications between host computers 110 and between host computer 110 and platform controller 120.

The operator groups 111 are respective groups of operators 112. The operator groups 111 may be intelligent groupings of operators 112. For example, an operator group 111 may be a grouping of operators 112 having similar types of characteristics (e.g., operators 112 supporting similar types of functions, operators 112 performing similar types of tasks, or the like). For example, an operator group 111 may be a grouping of operators 112 having similar needs (e.g., operators 112 dependent on a particular type of processing technology (e.g., GPU-dependent, JavaScript dependent, or the like), operators 112 having a need for low-latency communication, or the like), or the like, as well as various combinations thereof. The operator groups 111 may be provided using virtual machines (VMs), containers, or the like. It is noted that an operator group running in a container or a virtual machine is protected from other processes while allowing imposition of resource limits (e.g., restricting CPU usage, allocated memory, networking resources, or the like, as well as various combinations thereof).

The operators 112 are stream processing programs configured to process data of data streams. The operators 112 each may receive one or more input data streams (e.g., from one or more external sources, from one or more other operators 112, or the like) and send one or more output data streams (e.g., to one or more other operators 112, to one or more external sinks, or the like). The operators 112 may perform various types of data processing operations (e.g., cleaning, filtering, sorting, aggregating, or the like) which may vary for various applications (e.g., social media, Internet-of-Things, or the like).

The micro-brokers 115 may be configured to support various control functions for controlling various aspects of the stream processing platform 109. The micro-brokers 115 may be configured to support control of data streams for operators 112 of the operator groups 111 with which the micro-brokers 115 are associated, respectively. A micro-broker 115 may be configured to support control of data streams for the operators 112 of the operator group 111 with which the micro-broker 115 is associated, where the control may include control over data stream establishment (e.g., creation by source operators 112, connection by sink operators 112, allocation of resources by source and sink operators 112, or the like, as well as various combinations thereof), data stream communications management (e.g., pause, continue, stop, start, migrate, rate change, or the like, as well as various combinations thereof), data stream termination (e.g., deletion by source operators 112, disconnection by sink operators 112, deallocation of resources by source and sink operators 112, or the like, as well as various combinations thereof), or the like, as well as various combinations thereof. A micro-broker 115 may be configured to support communications of data streams for operators 112 of the operator group 111 with which the micro-broker 115 is associated using various communication modes (e.g., shared queues, shared memory, point-to-point connections, message brokers, or the like, as well as various combinations thereof) based on various considerations (e.g., relative locations of the operators 112, characteristics of the operators 112, characteristics of the data streams communicated for the operators 112, constraints of the stream processing platform 109, system conditions of the stream processing platform 109, or the like, as well as various combinations thereof). A micro-broker 115 may be configured to operate as a communication layer for the operators 112 of the operator group 111 with which the micro-broker 115 is associated, thereby providing each of the operators 112 of the operator group 111 with which the micro-broker 115 is associated with a single communication interface (to the micro-broker 115) irrespective of the number of other operators 112 with which each of the operators 112 of the operator group 111 with which the micro-broker 115 is associated may be communicating. A micro-broker 115 may be configured to support control of data streams for operators 112 of the operator group 111 with which the micro-broker 115 is associated based on remote control by the platform controller 120, based on local control performed by the micro-broker 115, or the like, as well as various combinations thereof. A micro-broker 115 may be configured to support various other functions for supporting control of data streams for operators 112 of the operator group 111 with which the micro-broker 115 is associated. The operation of the micro-brokers 115 may be further understood by way of reference to FIGS. 2 and 3.

The host controllers 118 may be configured to support various control functions for controlling the host computers 110, respectively. The host controllers 118 may be configured to support control functions for controlling host computers 110 based on commands received from platform controller 120, based on local determinations at the host computers 110, or the like, as well as various combinations thereof. The host controllers 118 may be configured to support control functions for controlling the host computers 110. The control functions may include configuration of the respective host computers 110 (e.g., configuration of host computers 110 to support operator groups 111, configuration of host computers 110 to support micro-brokers 115, or the like). The control functions may include configuration of operator groups 111 (e.g., membership of operator groups 111, instantiation of operator groups 111, migration of operator groups 111, or the like) on the respective host computers 110. The control functions may include configuration of operators 112 (e.g., functions supported by operators 112, instantiation of operators 112, migration of operators 112, or the like) on the respective host computers 110. The control functions may include configuration of micro-brokers 115 (e.g., instantiation of the micro-brokers 115, configuration of the micro-brokers 115, reconfiguration of the micro-brokers 115, or the like, as well as various combinations thereof) on the respective host computers 110. The control functions may include support for data streams (e.g., instantiation of data streams, changes to data streams (e.g., create, read, update, and delete (CRUD) operations), or the like) on the respective host computers 110. The control functions may include various combinations of such control functions, various other control functions, or the like, as well as various combinations thereof. The host controllers 118 of the host computers 110 may be configured to interact with the micro-brokers 115 of the host computers 110, respectively, for supporting various functions provided by the micro-brokers 115. The host controllers 118 may be configured to support various other control functions for controlling the host computers 110, respectively.

The platform controller 120 may be configured to support various control functions for controlling various aspects of the stream processing platform 109. The platform controller 120 may be configured to control host computers 110 (e.g., host computers 110 selected for hosting operator groups 111, configuration of host computers 110 to support operator groups 111, configuration of host computers 110 to support micro-brokers 115, or the like). The platform controller 120 may be configured to control operator groups 111 on host computers 110 (e.g., membership of operator groups 111, instantiation of operator groups 111, migration of operator groups 111, or the like). The platform controller 120 may be configured to control operators 112 of operator groups 111 on host computers 110 (e.g., functions supported by operators 112, instantiation of operators 112, migration of operators 112, or the like). The platform controller 120 may be configured to control micro-brokers 115 associated with operator groups 111 on host computers 110 (e.g., instantiation of the micro-brokers 115, configuration of the micro-brokers 115, reconfiguration of the micro-brokers 115, or the like, as well as various combinations thereof). The platform controller 120 may be configured to control data streams (e.g., instantiation of data streams, changes to data streams (e.g., CRUD operations, migration operations, rate changes, or the like). The platform controller 120 may be configured to control data streams using the micro-brokers 115 (e.g., instantiation of data streams, communications of data streams, management of data streams, termination of data streams, or the like, as well as various combinations thereof). The platform controller 120 may be configured to control data streams using the micro-brokers 115 based on use of a host computer Control Application Programming Interface (API) which may be supported between platform controller 120 and micro-brokers 115 via the host controllers 118 of the host computers 110 (namely, platform controller 120, host controllers 118, and micro-brokers 115 each may support the host computer control API). The platform controller 120 may be configured to support various other control functions for controlling various other aspects of the stream processing platform 109.

The platform controller 120 and the micro-brokers 115 may be configured such that the platform controller 120 completely or partially control micro-brokers 115. A given micro-broker 115 may be completely under the control of the platform controller 120 (e.g., the micro-broker 115 may be required to execute commands from the platform controller 120), may be partially under the control of the platform controller 120 (e.g., the micro-broker 115 may be partially autonomous in that it can accept or reject commands from the platform controller 120 based on local information available to the micro-broker 115 (e.g., state information maintained by the micro-broker 115 for operators 112 supported by the micro-broker 115, resource utilization of the operator group 111 with which the micro-broker 115 is associated, resource utilization of the host computer 110 hosting the operator group 111 with which the micro-broker is associated, system conditions, or the like), or the like, as well as various combinations thereof. It will be appreciated that such complete or partial control may be applied for various micro-brokers 115 at various layers of granularity (e.g., for all data streams, for certain data streams or groups of data streams, for all operators 112, for certain operators 112 or groups of operators 112, for all operator groups 111, for certain operator groups 111 or groups of operator groups 111, for all host computers 110, for certain host computers 110 or groups of host computers 110, or the like, as well as various combinations thereof).

The platform controller 120 and the micro-brokers 115 may be configured to support communications of and control over data streams under various conditions. The communications of data streams may be supported using various communication modes (e.g., shared queues, shared memory, point-to-point connections, message brokers, or others) which may be applied under various conditions. The control over data streams may include dynamic control over data streams, such as controlling selection of and switching between communication modes for data streams, controlling filtering criteria for data streams (e.g., adding filtering, modifying filtering, removing filtering, or the like), controlling operation of data streams (e.g., pausing and continuing a data stream, stopping and starting a data stream, or the like), modifying endpoints of a data stream (e.g., adding or removing stream sources to increase or decrease the number of stream sources, adding or removing stream sinks to increase or decrease the number of stream sinks, or the like), or the like, as well as various combinations thereof. The conditions may include changes in the data flowing through the data stream, changes in the operators 112 using the data stream (e.g., number, type, location, or the like), changes in data stream popularity (e.g., a stream may go viral over a short period of time (e.g., a video showing a developing story), a stream may go viral over a relatively long period of time (e.g., a funny video that is shared more widely over time), a stream may drop in popularity quickly, a stream may wane in popularity over time, and so forth), or the like, as well as various combinations thereof.

It will be appreciated that, although stream processing platform 109 is primarily presented with respect to specific types, numbers, and arrangements of elements, stream processing platform 109 may include various other types, numbers, and arrangements of elements.

It will be appreciated that, although system 100 is primarily presented with respect to specific types, numbers, and arrangements of elements, system 100 may include various other types, numbers, and arrangements of elements.

Figure 2:
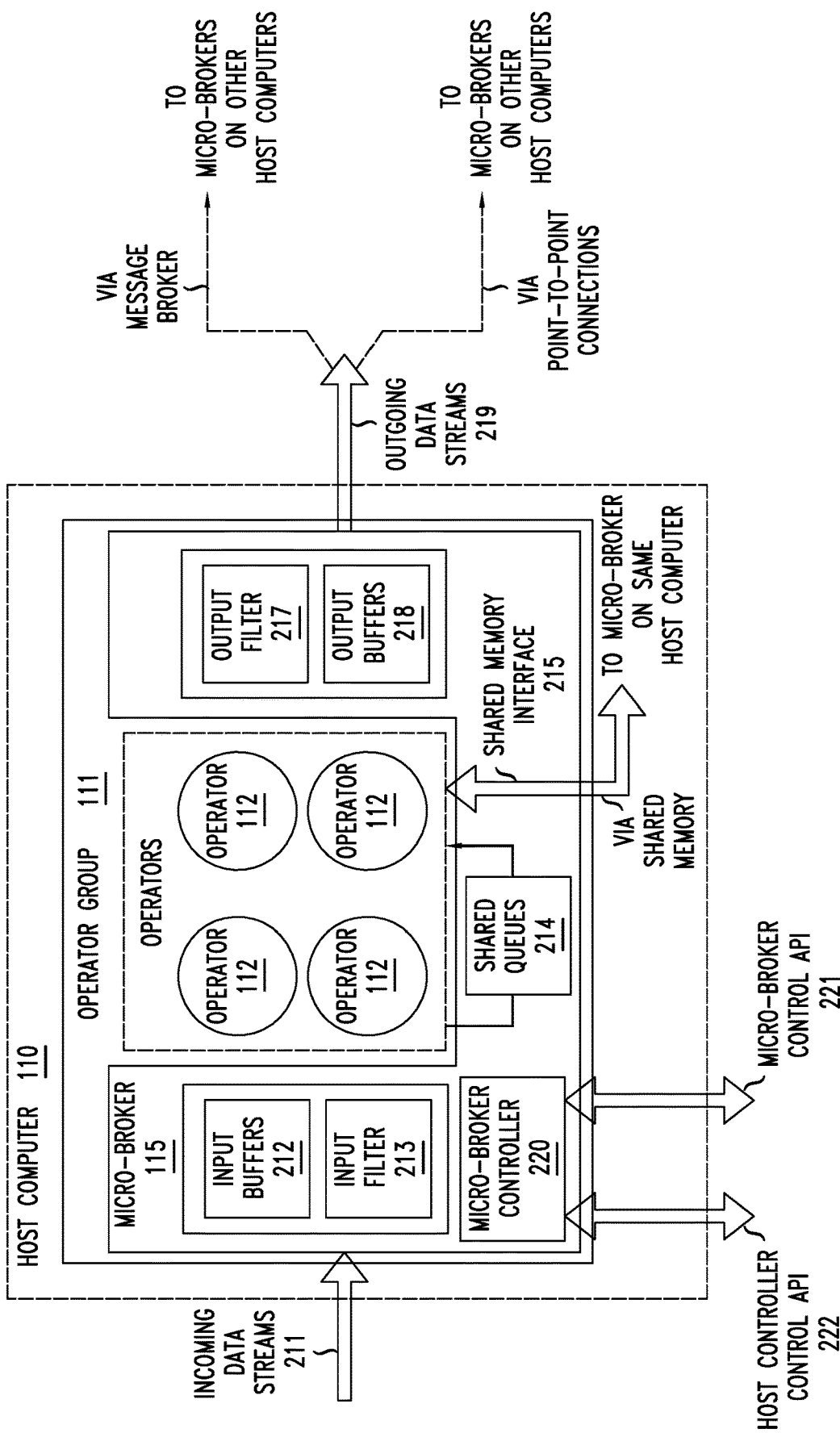
FIG. 2 depicts an example embodiment of a micro-broker configured to support communications of and control of data streams of operators of an operator group of a stream processing platform.

FIG. 2 depicts an example embodiment of a micro-broker configured to support communications of and control of data streams of operators of an operator group of a stream processing platform.

The micro-broker 115 is configured to support communications of and control of data streams of the operators 112 of an operator group 111. The micro-broker 115 is configured to support a data plane and a control plane.

The data plane supported by the micro-broker 115, as illustrated in FIG. 2, is configured to support communications of data streams of the operators 112 of the operator group 111 of the micro-broker 115. The data plane is configured to receive incoming data streams 211 (for processing by operators 112) and send outgoing data streams 219 (after processing by operators 112). The data plane also may include input capabilities configured to support the incoming data streams 211 (e.g., input buffers 212 configured to buffer incoming data streams 211 received by the host computer 110 before the incoming data streams 211 are processed by the operators 112, input filters 213 configured to pre-process incoming data streams 211 before the incoming data streams 211 are provided to the operators 112, or the like). The data plane also may include shared queues 214 configured to queue data of data streams being communicated between operators 112 of the operator group 111 (such that the data of the data streams does not need to be transferred via the entire communication stack of the host computer 110). The data plane also may include a shared memory interface 215 configured to support communication of data of data streams being transferred between operators 112 of the operator group 111 and operators 112 of a different operator group 111 on the same host computer 110 (via the micro-broker 115 associated with the different operator group 111 on the same host computer 110). The data plane also may include output capabilities configured to support the outgoing data streams 219 (e.g., output filters 217 configured to process data streams coming from the operators 112 to provide thereby the outgoing data streams 219, output buffers 218 configured to buffer the outgoing data streams 219 that are output from the host computer 110, or the like). The input buffers 212 and output buffers 218 are configured to control data streams entering and leaving the operators 112 of the operator group 111. The input filters 213 and output filters 217 are configured to filter data of the data streams (e.g., to operate on a stream to produce another stream, to prevent forwarding of data that downstream operators 112 may not be interested in (and, thus, conserve various types of resources), or the like, as well as various combinations thereof). The data plane may include various other elements, capabilities, or the like, as well as various combinations thereof. It will be appreciated that, although primarily presented with respect to a specific arrangement of elements of the data plane, the presented arrangement of the elements of the data plane may simply illustrate interaction between elements of the data plane that may be physically arranged in various other ways (e.g., the micro-brokers 115 may be implemented as part of the communication stacks of the processors of the operator groups 111 on which the operators 112 are hosted, as presented with respect to the example of FIGS. 3A and 3B).

The micro-broker 115 may be configured to support communication of data of a data stream between operators 112 where the operators 112 may be located at various locations within the stream processing platform 109 (e.g., between operators 112 within the same operator group 111, between operators 112 within different operator groups 111 located within the same host computer 110, between operators 112 within different operator groups 111 located within different host computers 110, or the like, as well as various combinations thereof). The micro-broker 15 may be configured to support communication of data of a data stream between operators 112 using various communication modes (e.g., shared queues for communications between operators 112 of the same operator group 111, shared memory of the host computer 110 for communications between operators 112 of different operator groups 111 in the same host computer 110, point-to-point connections or message brokers for communications between operators 112 of different operator groups 111 in different host computers 110, or the like, as well as various combinations thereof) depending on various factors (e.g., relative locations of the operators 112, operator characteristics of the operators 112, stream characteristics of the data streams (e.g., data type, popularity, or the like), system constraints of the stream processing platform 109, system conditions within the stream processing platform 109, or the like, as well as various combinations thereof).

The micro-broker 115 may be configured to support communication of data of a data stream between operators 112 within the same operator group 111. The micro-brokers 115 may be configured to support communication of data of a data stream between operators 112 within the same operator group 111 using the shared queues 214 of the operator group 111. The shared queues 214 queue the data as the data is being transferred between operators 112 of the same operator group 111. The shared queues 214 may make use of pointers to transfer the data between the operators 112 within the same operator group 111. The use of shared queues 214 in this manner enables the micro-broker 115 to communicate data between operators 112 of the operator group 111 in a manner which is point-to-point, which provides low latency data communication, and which makes efficient use of memory (e.g., used by both the reading and writing operators). The use of shared queues 214 in this manner, as noted above, enables direct communication of data between operators 112 of the operator group 111 without having to use the entire communication stack of the host computer 110 (e.g., without having to pay the penalty of one or more system calls and the corresponding locks which may accompany such system calls). It will be appreciated that, given various benefits associated with communication of data of a data stream between operators 112 within the same operator group 111, the platform controller 120 (e.g., an operator scheduling function configured to control placement of operators 112 within the stream processing platform 109) may be configured to give preference to placement of operators 112 that need to communicate data with each other in the same operator group 111 such that the associated micro-broker 115 can facilitate communication of data between the operators 112 locally to take advantage of those benefits.

The micro-broker 115 may be configured to support communication of data of a data stream between operators 112 within different operator groups 111 located within the same host computer 110. The micro-broker 115 may be configured to support communication of data of a data stream between operators 112 within different operator groups 111 located within the same host computer 110 using shared memory of the host computer 110. The data is transferred via the shared memory interface 215 supported by the micro-broker 115. The shared memory of the host computer 110 may be used as one or more first-in-first-out queues for exchanging messages between operators 112 of the different operator groups 111 located within the same host computer 110. The use of shared memory of the host computer 110 in this manner enables the micro-broker 115 to communicate data between operators 112 within different operator groups 111 located within the same host computer 110 in a manner which is point-to-point, which provides low latency data communication (e.g., since the messages will not travel through the entire communication stack or network interface card buffers of the host computer 110), and which makes efficient use of memory (e.g., used by both the reading and writing operators). The use of shared memory of the host computer 110 in this manner, as noted above, enables direct communication of data between operators 112 within different operator groups 111 located within the same host computer 110 without having to use the entire communication stack of the host computer 110 (e.g., without having to pay the penalty of one or more system calls, thereby reducing context switching). It is noted that, when containers are used to run operator groups 111 within a given host computer 110, each of the operator groups 111 of the host computer 110 will have a different IP address such that comparing IP addresses of the operator groups 111 to determine whether the operator groups 111 are running in the same host computer 110 will lead to the wrong information; instead, operator groups 111 running in the same host computer 110 (e.g., for taking advantage of shared memory based data communication) may be identified by determining whether the operator groups 111 are running under the same operating system, thereby enabling use of shared memory when containers are used to run operator groups 111 within the same host computer 110 (and, thus, speeding up communication and significantly reducing overhead, computation and communication resources, and latency) and obviating the need to use point-to-point transport layer connections when containers are used to run the operator groups 111 within the given host computer 110 (although it will be appreciated that such point-to-point transport layer connections could still be used). It will be appreciated that, given various benefits associated with communication of data of a data stream between operators 112 within different operator groups 111 located within the same host computer 110, the platform controller 120 (e.g., an operator scheduling function configured to control placement of operators 112) may be configured to give preference to placement of operators 112 that need to communicate data with each other in the same host computer 110 (e.g., in different operator groups 111 within the host computer 110 if the operators 112 cannot be placed within the same operator group 111 within the host computer 110) such that the associated micro-broker 115 can facilitate communication of data between the operators 112 to take advantage of those benefits.

The micro-broker 115 may be configured to support communication of data of a data stream between operators 112 within different operator groups 111 located within different host computers 110. The micro-broker 115 may be configured to support communication of data of a data stream between operators 112 within different operator groups 111 located within different host computers 110 using a point-to-point connection (e.g., a point-to-point transport layer connection or other suitable point-to-point connection), a message broker, or the like, as well as various combinations thereof.

The micro-broker 115, as indicated above, may be configured to support communication of data of a data stream between operators 112 within different operator groups 111 located within different host computers 110 using a point-to-point connection. This type of communication may be supported under various conditions (e.g., for a stream that has only a single source and a single sink, for a stream that is relatively unpopular, or the like). The point-to-point connection may be a point-to-point transport layer connection. The point-to-point transport layer connection may be a Transmission Control Protocol (TCP) connection, a User Datagram Protocol (UDP) connection, Simple Text Oriented Message Protocol (STOMP), Advanced Message Queuing Protocol (AMQP), or the like. The use of a point-to-point connection in this manner, as noted above, enables direct communication of data between operators 112 within different operator groups 111 located within different host computers 110 without having to use a message broker (and, thus, without potential problems which may result from use of a message broker).

The micro-broker 115, as indicated above, may be configured to support communication of data of a data stream between operators 112 within different operator groups 111 located within different host computers 110 using a message broker. A message broker may be a process configured to arrange the communication between a message source and a message destination. The message broker may use a publish/subscribe messaging pattern to allow operators 112 to send data and to allow operators to receive data. In general, publish/subscribe is a messaging pattern where senders of messages, called publishers, do not program the messages to be sent directly to specific receivers, called subscribers, but, rather, the publishers categorize published messages into classes without knowledge of which subscribers, if any, there may be and, similarly, subscribers express interest in one or more classes and only receive messages that are of interest, without knowledge of which publishers, if any, there may be. The message broker may use a publish/subscribe messaging pattern to allow operators 112 to send data by publishing to one or more classes (e.g., the data is provided from the sending operator 112 to the message broker by the associated micro-broker 115) and to allow operators 112 to receive data by subscribing to one or more classes (e.g., the data is received by the receiving operator 112 from the message broker by the associated micro-broker 115). The message broker may forward data to two or more operators 112 (or even a large number of operators 112) by cloning the incoming data. The message broker may use an application protocol based on an underlying transport protocol. The application protocol of the message broker may be the Advanced Message Queuing Protocol (AMQP), the Message Queuing Telemetry Transport (MQTT) protocol, the Zero Message-Queue (ZMQ) protocol, or the like. The underlying transport protocol of the message broker may be TCP or any other suitable transport protocol. The use of a message broker to support communication of data of a data stream between operators 112 within different operator groups 111 located within different host computers 110 may be used while the data stream is popular. The use of a message broker in this manner, as noted above, enables direct communication of data between operators 112 within different operator groups 111 located within different host computers 110 in an efficient manner when a relatively large number of operators 112 are interested in receiving the data stream (e.g., for relatively popular data stream).

The micro-broker 115, as indicated above, may be configured to support communication of data of a data stream between operators 112 based on various types micro-broker interfaces (at least some of which are illustrated in FIG. 2). For example, the micro-broker 115 may be configured to support an external stream source to micro-broker interface for enabling the micro-broker 115 to receive messages of a data stream from an external source of such messages (e.g., in a situation in which the external source is not under the control of a micro-broker), a micro-broker to micro-broker interface for enabling the micro-broker 115 to exchange messages of a data stream with another micro-broker, a message queue to micro-broker interface for enabling the micro-broker 115 to receive messages of a data stream from a message queue, a micro-broker to message queue interface for enabling the micro-broker 115 to send messages of a data stream to a message queue, and a micro-broker to external sink interface for enabling the micro-broker 115 to send messages of a data stream to an external sink for such messages. It will be appreciated that a message broker 115 may be configured to support fewer or more such data communication interfaces.

It is noted that the micro-brokers 115 may be transparent to the operators 112, such that the operators 112 are not aware of the manner in which the data streams are being communicated (e.g., the operators 112 do not know if the data stream is being transferred via a shared queue, shared memory, a point-to-point connection, or a message broker).

The micro-broker 115, as noted above, may be configured to support communication of data of data streams between various combinations of operators 112 using various combinations of such communication capabilities.

The micro-broker 115, as indicated above, may be configured to support communication of data of a data stream between operators 112 using various communication modes depending on relative locations of the operators 112. The operation of micro-brokers 115 in supporting communication of a data stream may be further understood by way of reference to the example of FIGS. 3A and 3B. Namely, FIGS. 3A and 3B depict an example embodiment illustrating use of micro-brokers associated with operator groups of a host computer to support communications of a data stream from an external source host computer to an external sink host computer.

Figure 3A:
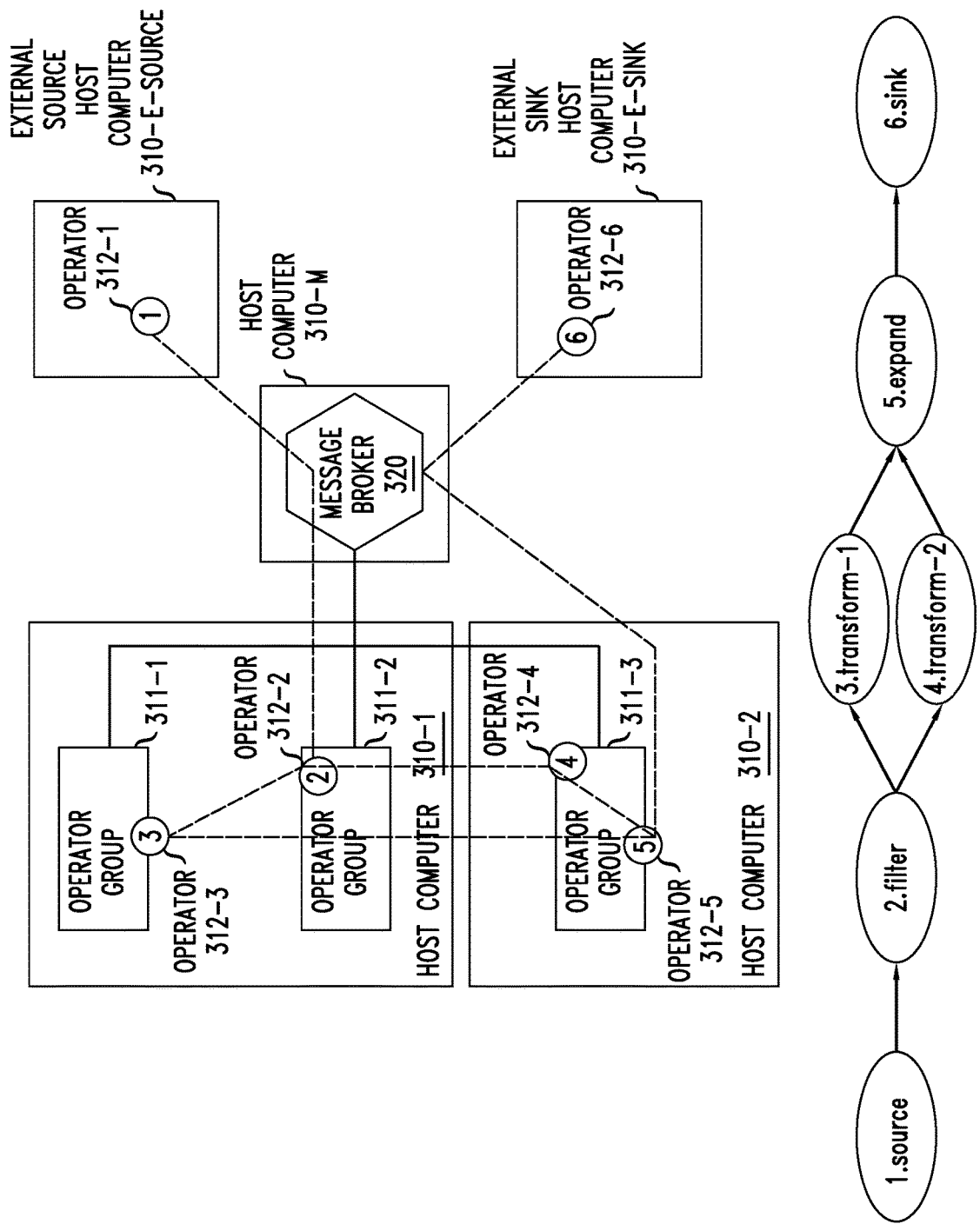
FIGS. 3A and 3B depict an example embodiment illustrating the use of micro-brokers associated with operator groups of a host computer to support communications of a data stream from an external source host computer to an external sink host computer.
Figure 3B:
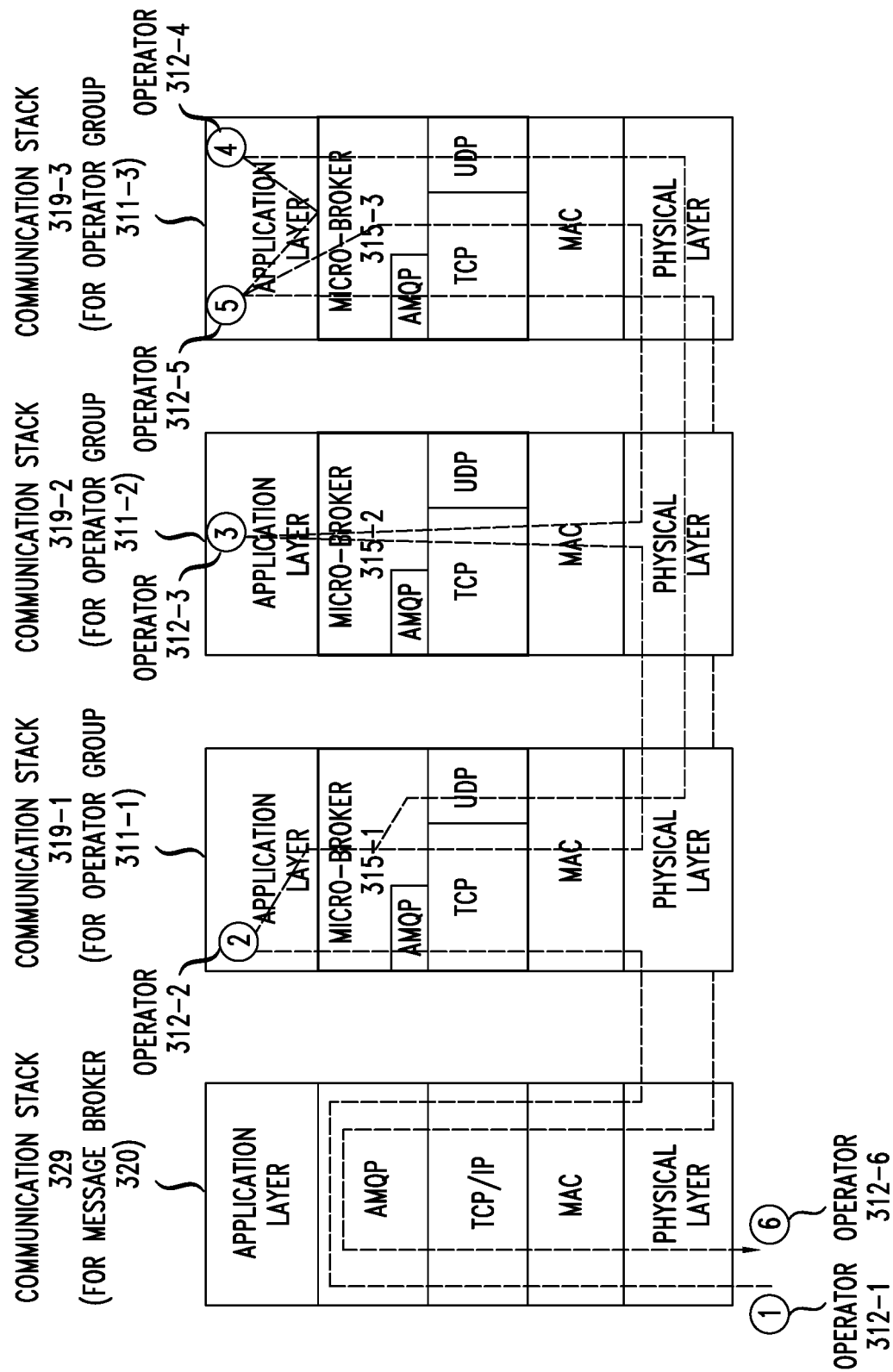

The stream processing platform 300, as illustrated in FIGS. 3A and 3B, includes five host computers 310. The host computers 310 include a host computer 310-1, a host computer 310-2, a host computer 310-M, and two external host computers 310-E (including an external source host computer 310-E-Source and an external sink host computer 310-E-Sink). The host computers 310-1 and 310-2 include operator groups 311 (illustratively, host computer 310-1 includes operator groups 311-1 and 311-2 and host computer 310-2 includes an operator group 311-3). The external source host computer 310-E-Source hosts a first operator 312-1 (denoted as Source), the operator group 311-2 of host computer 310-1 hosts a second operator 312-2 (denoted as filter), the operator group 311-1 of host computer 310-1 hosts a third operator 312-3 (denoted as transform), the operator group 311-3 of host computer 310-2 hosts a fourth operator 312-4 (denoted as transform) and a fifth operator 312-5 (denoted as expand), and the external sink host computer 310-E-Sink hosts a sixth operator 312-6 (denoted as sinkop).

The stream processing platform 300, as illustrated in FIGS. 3A and 3B, includes communication stacks configured to support communication of data streams. The three operator groups 311 and the message broker 320 support respective communication stacks (illustratively, the operator groups 311-1-311-3 support communication stacks 319-1-319-3, respectively, and the message broker 320 supports a communication stack 329). The communication stacks 319 of the operator groups 311 each include a physical layer (denoted in FIGS. 3A and 3B as PHY), a data link layer (illustratively, e.g., based on Media Access Control (MAC)), a transport layer (illustratively, e.g., supporting TCP/IP and UDP), an application message queuing layer (illustratively, e.g., AMQP), a micro-broker 315 configured to operate as a layer within the communication stack 319 (illustratively, communication stack 319-1 for operator group 311-1 includes micro-broker 315-1, communication stack 319-2 for operator group 311-2 includes micro-broker 315-2, and communication stack 319-3 for operator group 311-3 includes micro-broker 315-3), and an application layer. The micro-brokers 315 of the operator groups 311 are configured to operate between the application layer and the data link layer of the communication stacks 319 and include, or support communications of data streams using, protocols of the application message queuing layer and the transport layer so as to support communications of data streams using certain communication modes (e.g., via the message broker 320 based on AMQP, via a point-to-point connection based on TCP, UDP, SCTP, or the like). The micro-brokers 315 also are depicted as including other communications capabilities, represented by the portions of the boxes depicting the micro-brokers 315 that exclude the protocols of the application message queuing layer and the transport layer, so as to support communications of data streams using certain communication modes (e.g., via shared memory of host computer 310-1, via local queues of the operator groups 311, or the like). The communication stack 329 of the message broker 320 also includes a physical layer (denoted in FIGS. 3A and 3B as PHY), a data link layer (illustratively, e.g., based on MAC), a transport layer (illustratively, e.g., supporting TCP/IP and UDP), an application message queuing layer (illustratively, e.g., AMQP), and an application layer. It will be appreciated that, although the communication stacks 319-1 and 319-2 for operator groups 311-1 and 311-2, respectively, are illustrated as separate stacks for purposes of clarity in illustrating flow of messages of the data stream, the communication stacks 319-1 and 319-2 for operator groups 311-1 and 311-2, respectively, may share at least part of the lower portions of the communication stacks 319-1 and 319 (e.g., the PHY, MAC, and transport layers) as the operator groups 311-1 and 311-2 are part of the same host computer (host computer 310-1 as illustrated in FIG. 3A). It will be appreciated that the communication stacks 319 of the operator groups 311 and the communication stack 329 of the message broker 320 may support various other layers, protocols, arrangements of layers or protocols, or the like, as well as various combinations thereof.

The stream processing platform 300, as illustrated in FIGS. 3A and 3B, is configured to support communication of the data flow using the micro-brokers 315 associated with the operator groups 311 of the host computers 310-1 and 310-2. The data flow of the data stream is from the first operator 312-1 to the second operator 312-2 (from the operator that produces the source to the filter operator), from the second operator 312-2 to the third operator 312-3 and to the fourth operator 312-4 in parallel (from the filter operator to both of the transform operators), from the third operator 312-3 and the fourth operator 312-4 to the fifth operator 312-5 in parallel (from both of the transform operators into the expand operator), and from the fifth operator 312-5 to the sixth operator 312-6 (from the expand operator to the operator at the sink). The path of the data stream is also presented within the context of the communication stacks for illustrating that the micro-brokers 315 are configured to support communication of the data stream using different communication modes on different hops of the overall data stream path based on the relative locations of operators 312 on the different hops of the overall data stream path.

The data of the data stream is sent from operator 312-1 on external source host computer 310-E-Source to the operator 312-2 hosted on operator group 311-2 using the message broker communication mode since operator 312-1 and operator 312-2 are located on different host computers 310. The message broker 320 receives data from operator 312-1 on external source host computer 310-E-Source. The data traverses the communication stack 329 of the message broker 320 from the physical layer up to the application message queuing layer and then traverses the communication stack 329 of the message broker 320 from the application message queuing layer back down to the physical layer to be sent toward operator group 311-2 for delivery to operator 312-2 hosted on operator group 311-2. The data traverses the communication stack 319-2 of the operator group 311-2 from the physical layer up to the application layer where the operator 312-2 is running.

The data of the data stream is sent from operator 312-2 hosted on operator group 311-2 to operator 312-3 hosted on operator group 311-1 and to operator 312-4 hosted on operator group 311-3, in parallel, using the point-to-point communication mode since operator 312-2 is located on a different operator group 311 from operator 312-3 and operator 312-4 (illustratively, using a point-to-point TCP connection to send the data to operator 312-3 and using a point-to-point UDP connection to send the data to operator 312-4). The use of two point-to-point connections is transparent to the operator 312-2; the operator 312-2 simply provides the data to the micro-broker 315-2 in the communication stack 319-2 of operator group 311-2 and the micro-broker 315-2 takes care of splitting the data stream from the operator 312-2 hosted on operator group 311-2 into two data streams to be provided to the operator 312-3 hosted on operator group 311-1 and to the operator 312-4 hosted on operator group 311-3. On the sending side, for both data streams, the data traverses the communication stack 319-2 of the operator group 311-2 from the micro-broker 315-2 down to the physical layer to be sent toward the operator 312-3 hosted on the operator group 311-1 (via TCP at the transport layer) and the operator 312-4 hosted on the operator group 311-3 (via UDP at the transport layer). On the receiving side, the data traverses the communication stack 319-1 of the operator group 311-1 from the physical layer up to the application layer where the operator 312-3 is running (again, via TCP at the transport layer) and, similarly, the data traverses the communication stack 319-3 of the operator group 311-3 from the physical layer up to the application layer where the operator 312-4 is running (again, via UDP at the transport layer).

The data of the data stream is sent from operator 312-3 hosted on operator group 311-1 to operator 312-5 hosted on operator group 311-3 using the point-to-point communication mode since operator 312-3 is located on a different operator group 311 from operator 312-5 (illustratively, using a point-to-point TCP connection to send the data to operator 312-5). On the sending size, the data traverses the communication stack 319-1 of the operator group 311-1 from the micro-broker 315-3 down to the physical layer to be sent toward the operator 312-5 hosted on operator group 311-5 (via TCP at the transport layer). On the receiving side, the data traverses the communication stack 319-3 of the operator group 311-3 from the physical layer up to the application layer where the operator 312-5 is running (again, via TCP at the transport layer).

The data of the data stream is sent from operator 312-4 hosted on operator group 311-3 to operator 312-5 hosted on operator group 311-3 using a local communication mode (e.g., shared memory if the operators 312-4 and 312-5 are in different operator groups of host computer 310-2 or shared queues if the operators 312-4 and 312-5 are in the same operator groups of host computer 310-2) since operator 312-4 and operator 312-5 are located on the same operator group 311-3. This is illustrated as a "dip" into and out of micro-broker 315-3 in the communication stack 319-3 of operator group 311-3 (namely, the entire communication stack 319-3 of operator group 311-3 does not need to be traversed in order to transfer the data of the data stream between the co-located operators 312-4 and 312-5, thereby providing various efficiencies).

The data of the data stream is sent from operator 312-5 hosted on operator group 311-3 to operator 312-6 hosted on external sink host computer 310-E-Sink using the message broker communication mode (namely, using message broker 320) since operator 312-5 and operator 312-6 are located on different host computers 310. The data traverses the communication stack 319-3 of the operator group 311-3 from the application layer where operator 312-5 is running down to the physical layer to be sent toward operator 312-6 hosted on external sink host computer 310-E-Sink. The message broker 320 receives data from operator 312-5 hosted on operator group 311-3. The data traverses the communication stack 329 of the message broker 320 from the physical layer up to the application message queuing layer and then traverses the communication stack 329 of the message broker 320 from the application message queuing layer back down to the physical layer to be sent toward external sink host computer 310-E-Sink for delivery to operator 312-6 hosted on external sink host computer 310-E-Sink.

It is noted that the application layers may be implemented in various ways. In general, the application layer is an abstraction layer that specifies the shared communications protocols and interface methods used by hosts in a communications network. The application layer abstraction is used in both of the standard models of computer networking: the Internet Protocol Suite (TCP/IP) and the Open Systems Interconnection (OSI) model. Although both models use the same term for their respective highest-level layer, the detailed definitions and purposes are different. In TCP/IP, the application layer includes the communications protocols and interface methods used in process-to-process communications across an IP computer network. The application layer standardizes communication and depends upon the underlying transport layer protocols to establish host-to-host data transfer channels and manage the data exchange in a client-server or peer-to-peer networking model. Though the TCP/IP application layer generally does not describe specific rules or data formats that applications must consider when communicating, the original specification (namely, Request For Comment (RFC) 1123) does rely on and recommend the robustness principle for application design. In the OSI model, the definition of the application layer is narrower in scope as the OSI model generally defines the application layer as the user interface responsible for displaying received information to the user, whereas, by contrast, the TCP/IP model does not concern itself with such detail. Additionally, the OSI model explicitly distinguishes additional functionality below the application layer and above the transport layer at two additional levels (namely, the session layer and the presentation layer) and specifies a strict modular separation of functionality at these layers and provides protocol implementations for each layer.

It is noted that the example stream processing platform 300 of FIGS. 3A and 3B can be used in various applications, examples of which are given below.

For example, the example stream processing platform 300 of FIGS. 3A and 3B may be used for temperature measurement. Consider a situation where the operator producing the source performs temperature measurements and provides a stream of measurements. The filter operator checks for any dramatic changes and passes through only hourly updates, except when there is a dramatic change. The output of the filter is processed by two different transform operators, one concentrating on disruptive changes, and the other on averages. Both outputs are provided to an operator that expands the observations using historical measurements. The results are provided to an operator that formats the results for display.

For example, the example stream processing platform 300 of FIGS. 3A and 3B may be used for video surveillance processing. Here, the operator that produces the source is the raw feed of a video camera. The filter operator performs some basic filter functions on the incoming video feed. Two different transforms are being performed on the filtered video feed. The output of the two transforms is then combined and expanded, after which it is provided to the operator that prepares the output for a user(s) or subscriber(s).

It will be appreciated that the example stream processing platform 300 of FIGS. 3A and 3B can be used in various other applications.

It will be appreciated that the example of FIG. 3 merely illustrates some of the ways in which micro-brokers 315 may be used to facilitate communications of data streams in stream processing platform 300.

The micro-brokers 115 may be configured to support communication of data of data streams between various combinations of operators 112 using various other capabilities.

The control plane supported by the micro-broker 115, as illustrated in FIG. 2, is configured to support control of data streams of the operators 112 of the operator group 111 of the micro-broker 115. The control plane includes a micro-broker controller 220 that is configured to support a micro-broker control API 221 and a host computer control API 222.

The micro-broker controller 220 of micro-broker 115 is configured to support control of data streams of operators 112 of the operator group 111. The micro-broker controller 220 of micro-broker 115 may be configured to support control of data streams of operators 112 of the operator group 111 by controlling use of communication modes for data streams of operators 112 of the operator group 111 based on various considerations, such as relative locations of the operators 112 of the data streams relative to associated destination operators for the data streams (e.g., which may be operators 112 of operator group 111 or other operators on other operator groups of host computer 110 or other operators on other host computers) or other considerations (e.g., operator characteristics, stream characteristics, system constraints, system conditions, or the like, as well as various combinations thereof). The micro-broker controller 220 of micro-broker 115 may be configured to support control of data streams of operators 112 of the operator group 111 using the host computer control API 222 which is configured to support control plane communications between the micro-broker 115 and the platform controller 120 (e.g., for enabling micro-broker controller 220 of micro-broker 115 and, thus, the micro-broker 115 to control of data streams of operators 112 of the operator group 111 under the control of or based on interaction with the platform controller 120). The micro-broker controller 220 of micro-broker 115 may be configured to support control of data streams of operators 112 of the operator group 111 using the micro-broker control API 221 which is configured to support control plane communications between the micro-broker 115 and other micro-brokers 115 (e.g., for enabling micro-broker controller 220 of micro-broker 115 and, thus, the micro-broker 115 to control of data streams of operators 112 of the operator group 111 based on peering with other micro-brokers which may be local to or remote from host computer 110, for enabling micro-brokers 115 to collect information indicative of network quality based on communications between micro-brokers 115 (e.g., negotiations, communications of data streams, or the like), or the like, as well as various combinations thereof). It is noted that the operation of micro-broker controller 220 of micro-broker 115 to support control of data streams of operators 112 of the operator group 111 using the host computer control API 222 and the micro-broker control API 221 may be further understood by way of reference to FIGS. 10 and 11. The micro-broker controller 220 of micro-broker 115 may be configured to support control of data streams of operators 112 of the operator group 111 using finite state machines for the operators 112 to control the data streams communicated by the operators 112, respectively. The micro-broker controller 220 of micro-broker 115 may be configured to support source finite state machines for controlling the states of operators 112 operating as sources of data streams (an example of which is presented with respect to FIG. 4A), sink finite state machines for controlling the states of operators 112 operating as sinks of data streams (an example of which is presented with respect to FIG. 4B), and control finite state machines configured to coordinate source finite state machines and sink finite state machines of data streams (an example of which is presented with respect to FIG. 4C). It will be appreciated that the micro-broker controller 220 of micro-broker 115 may be configured to support various other control capabilities for supporting control of data streams of operators 112 of the operator group 111.

The micro-broker control API 221 supported by micro-broker 115, as indicated above, is configured to support control plane communications between the micro-broker 115 and other micro-brokers 115 (e.g., of the host computer 110 or other host computers 110). The micro-broker 115 may be configured to use the micro-broker control API 221 for various control purposes, such as for supporting control over communications of data streams by operators 112 of the operator group 111 for the micro-broker 115 (e.g., agreeing on communication modes, negotiating parameters associated with communication modes to be used, or the like, as well as various combinations thereof), supporting control of data streams of operators 112 of the operator group 111 for the micro-broker 115 (e.g., pause, continue, disconnect, or the like), for collecting information indicative of network quality (e.g., statics, status information, or the like, as well as various combinations thereof) based on communications between micro-brokers 115 (e.g., negotiations, communications of data streams, or the like) for use in supporting control over communications of data streams by operators 112 of the operator group 111 for the micro-broker 115 or supporting control of data streams of operators 112 of the operator group 111 for the micro-broker 115, or the like, as well as various combinations thereof.

The host computer control API 222 supported by micro-broker 115, as indicated above, is configured to support control plane communications between the micro-broker 115 and the platform controller 120, such that the host computer control API 222 is supported by the micro-broker 115 and the platform controller 120. The host computer control API 222 may be configured to support control plane communications between the micro-broker 115 and the platform controller 120 via the associated host controller 118 of the host computer 110 on which the micro-broker 115 is operator, such that the host computer control API 222 also may be supported by the host controller 118 for facilitating control communications between the micro-broker 115 and the platform controller 120 based on the host computer control API 222.

The host computer control API 222 may be configured to enable the platform controller 120 to provide various control functions for data streams via the micro-broker 115. The platform controller 120 can use the host computer control API 222 to perform high-level orchestration of operators 112 which communicate via data streams (e.g., controlling placement of the operators 112, controlling or suggesting the manner in which operators 112 will communicate, or the like), controlling data streams (e.g., data stream control functions such as creating, deleting, pausing, continuing, stopping, restarting, splitting, aggregating, migrating, and so forth), or the like, as well as various combinations thereof. The micro-broker 115 can use the host computer control API 222 to obtain various types of control information (e.g., control commands which may be executed by the micro-broker 115, control information which may be used by micro-broker 115 to perform local processing, or the like, as well as various combinations thereof) which may be used by the micro-broker 115 to control data streams supported by operators 112 of the operator group 111 with which the micro-broker 115 is associated. In this manner, the host computer control API 222 enables the platform controller 120 to instantiate, protect, migrate, and remove data streams dynamically within the stream processing platform 109 via the micro-brokers 115.

The host computer control API 222 may include various function calls which may be used to provide various functions discussed herein as being supported by the platform controller 120 and the micro-broker 115 using the host computer control API 222. For example, the host computer control API 222 may be configured to support at least the following function calls (where i=incoming and o=outgoing): createStream$^{i,o}$, deleteStream$^{i,o}$, pauseStream$^{i,o}$, continueStream$^{i,o}$ stopStream$^{i,o}$, restartStream$^{i,o}$, addSinkStream$^{o}$, deleteSinkStream$^{o}$, addSourceStream$^{i}$, and deleteSourceStream$^{i}$. The createStream$^{i,o}$ function allows the platform controller 120 to add data streams by specifying the stream owner (e.g., user) and endpoints (e.g., operators 112) using universal resource locator syntax (e.g., <protocol>://<site>). The deleteStream$^{i,o}$ function allows the platform controller 120 to remove an ongoing data stream. The pauseStream$^{i,o}$ function allows the platform controller 120 to freeze a data stream while continuing to queue data of the data stream so that the data stream can be played back when the data stream is continued. The continueStream$^{i,o}$ function allows the platform controller 120 to reactivate a data stream that has been paused, including supporting playout of data of the data stream that has been queued while the data stream was paused. The stopStream$^{i,o}$ function allows the platform controller 120 to stop a data stream and will discard incoming traffic (rather than queuing the traffic as in the case when a data stream is paused). The restartStream$^{i,o}$ function allows the platform controller 120 to restart a data stream that has been stopped. The addSourceStream$^{i}$ and deleteSourceStream$^{i}$ functions allow the platform controller 120 to add/remove new sources to a data stream, respectively. The addSinkStream$^{o}$ and deleteSinkStream$^{o}$ functions allow the platform controller 120 to add/remove new destinations to a data stream, respectively. It is noted that the addSourceStream$^{i}$, deleteSourceStream$^{i}$, addSinkStream$^{o}$, and deleteSinkStream$^{o}$ functions also allow the platform controller 120 to specify filtering criteria (e.g., filters) configured to clean incoming/outgoing traffic. It will be appreciated that fewer or more functions may be supported by the host computer control API 222 and, thus, also by the platform controller 120 and the micro-brokers 115.

The micro-broker controller 220 of micro-broker 115, as discussed above, may be configured to support finite state machines for controlling the states of operators 112 to support communication of data streams of operators 112. The finite state machines for the controlling the states of operators 112 may be configured to support various states and associated state transitions configured to support the various functions of the host computer control API 222 as discussed above (e.g., createStream$^{i,o}$, deleteStream$^{i,o}$, pauseStream$^{i,o}$, continueStream$^{i,o}$, stopStream$^{i,o}$, restartStream$^{i,o}$, addSinkStream$^o$, deleteSinkStream$^o$, addSourceStream$^i$, and deleteSourceStream$^i$, and so forth). The finite state machines for controlling the states of two operators 112 supporting communication of a data stream there between may include a source finite state machine for controlling the state of the operator 112 operating as the source of the data stream (an example of which is presented with respect to FIG. 4A), a sink finite state machine for controlling the state of the operator 112 operating as the sink of the data stream (an example of which is presented with respect to FIG. 4B), and a control finite state machine configured to coordinate the source finite state machines and the sink finite state machines of the data stream (an example of which is presented with respect to FIG. 4C).

Figure 4A:
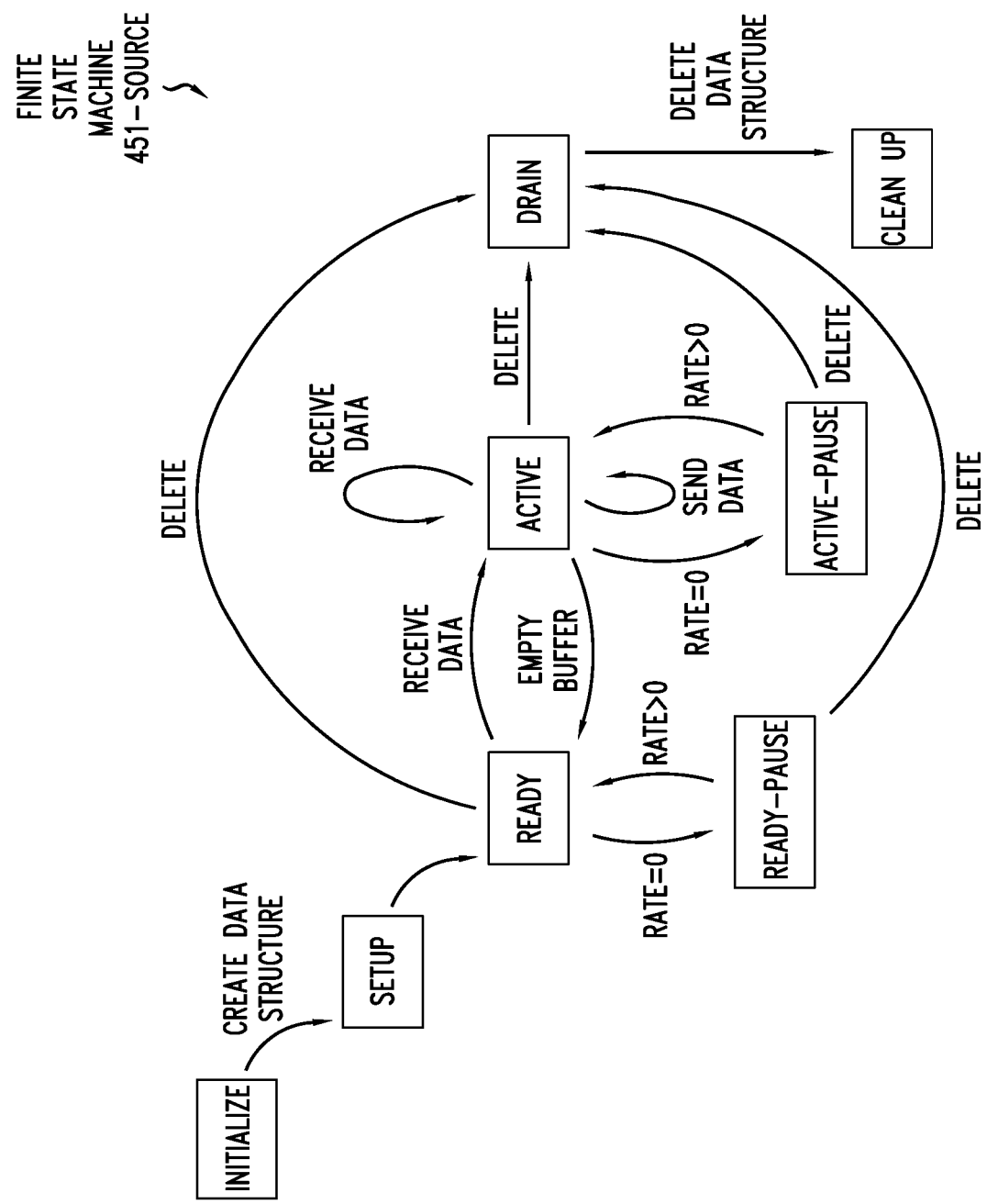
FIGS. 4A-4C depict examples of finite state machines for use by a micro-broker controller of a micro-broker to support control of data streams processed by operators of an operator group.
Figure 4B:
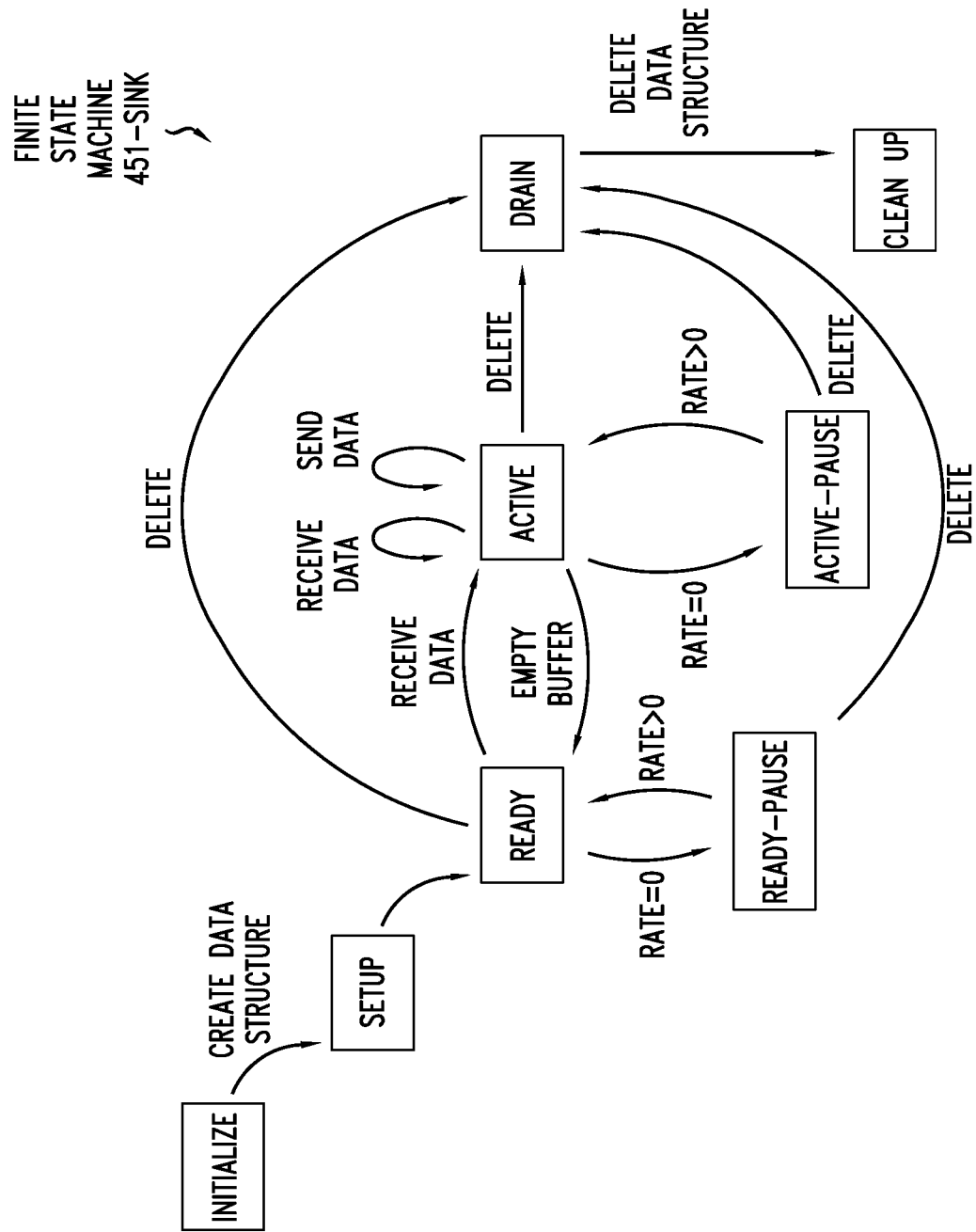
Figure 4C:
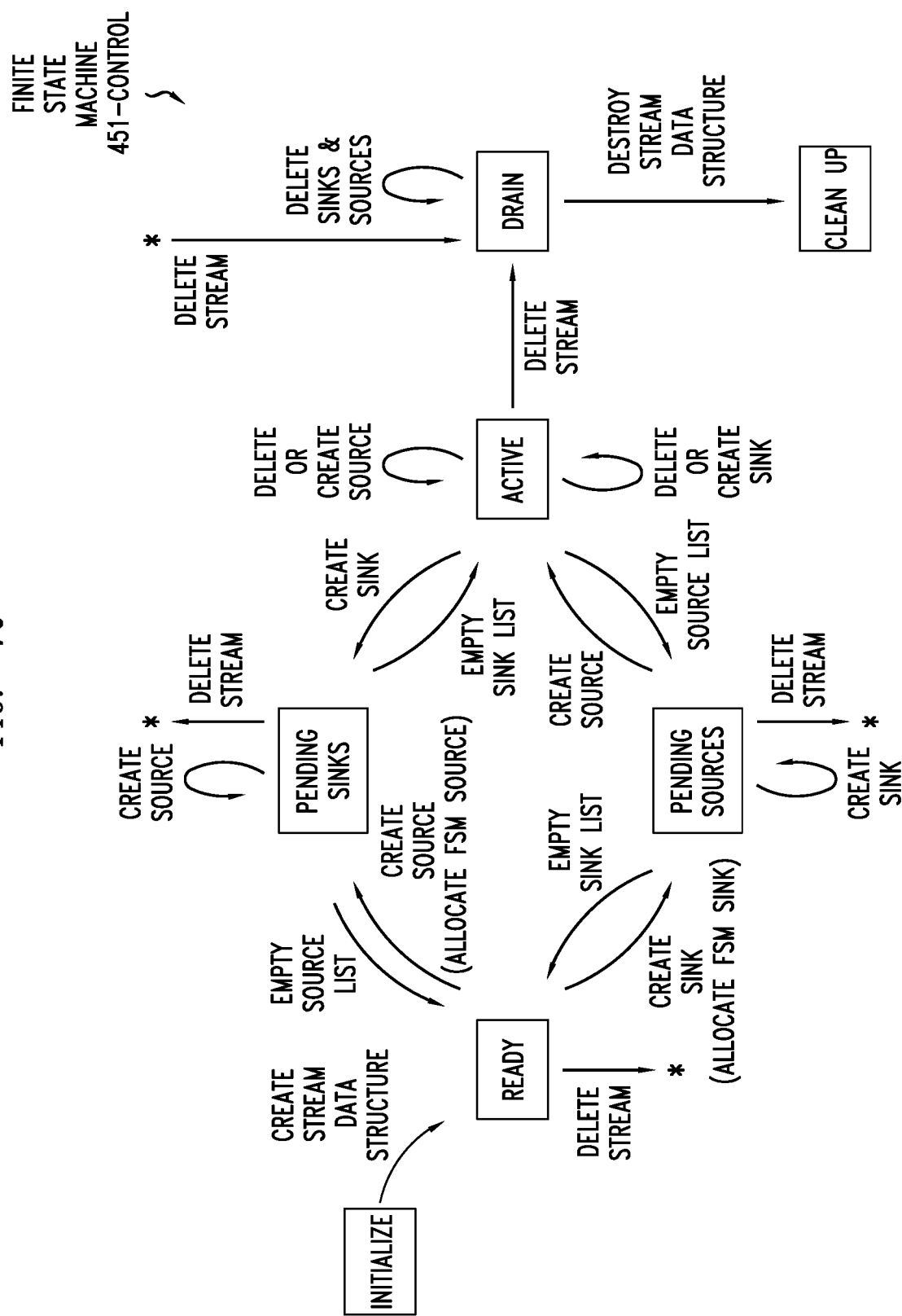

FIGS. 4A-4C depict examples of finite state machines for use by a micro-broker controller of a micro-broker to support control of data streams of operators of an operator group.

FIG. 4A depicts an example of a source finite state machine 451-Source configured for use by a micro-broker controller of a micro-broker (e.g., micro-broker controller 220 of FIG. 2) operating as a source of a data stream of an operator 112 to control the data stream of the operator 112. The source finite state machine 451-Source is configured to support the following states: INIT, SETUP, READY, ACTIVE, DRAIN, READY-PAUSE, ACTIVE-PAUSE, and CLEANUP. It will be appreciated that fewer or more, as well as different, states may be supported. The source finite state machine 451-Source is configured to support various state transitions between the various states under various conditions (e.g., responsive to data stream control commands from a host controller via host computer control API 222 or data stream control commands from remote micro-broker controllers via micro-broker control API 221, responsive to local determinations by the micro-broker controller at the micro-broker 115, or the like, as well as various combinations thereof). In the SETUP state, the source finite state machine 451-Source sets up a data structure including relevant information about the data stream (e.g., source, identification, security information, or the like) and meta-information about the stream and prepares to receive the information (e.g. opens socket). The source finite state machine 451-Source then transitions to the READY state. The platform controller could place the data stream on hold, in which case source finite state machine 451-Source transitions to the READY-PAUSE state. While in the READY-PAUSE state, the source finite state machine 451-Source will not accumulate any message data that arrives, i.e. buffers will continue empty. The data stream can return to the READY state when the platform controller continues the stream. While in the READY state, the source finite state machine 451-Source can transition to ACTIVE as stream messages arrive. This transition involves active stream buffer management. If no new messages arrive, and the buffer becomes empty, source finite state machine 451-Source reverts to the READY state. While in the ACTIVE state, source finite state machine 451-Source can transition to the ACTIVE-PAUSE state. In the ACTIVE-PAUSE state, the source finite state machine 451-Source does not accumulate new message (i.e. discards messages) and keeps the buffer intact. When the platform controller restarts the stream source, the source finite state machine 451-Source transitions back to the ACTIVE state with the buffer as it was before being paused. If the source finite state machine 451-Source receives the "delete data stream" command in the READY, ACTIVE, READY-PAUSE, or ACTIVE-PAUSE states, the source finite state machine 451-Source first transitions to the DRAIN state. The source finite state machine 451-Source stops processing any incoming control and data messages and closes any interface (e.g. incoming socket), but maintains the messages in the buffer until they have been sent or until a timeout releases the buffer. It will be appreciated that fewer or more, as well as different, state transitions may be supported.

FIG. 4B depicts an example of a sink finite state machine 451-Sink configured for use by a micro-broker controller of a micro-broker operating as a sink of a data stream of an operator 112 to control the data stream of the operator 112. The sink finite state machine 451-Sink is configured to support the following states: INIT, SETUP, READY, ACTIVE, DRAIN, READY-PAUSE, ACTIVE-PAUSE, and CLEANUP. It will be appreciated that fewer or more, as well as different, states may be supported. The sink finite state machine 451-Sink is configured to support various state transitions between the various states under various conditions (e.g., responsive to data stream control commands from a host controller via host computer control API 222 or data stream control commands from remote micro-broker controllers via micro-broker control API 221, responsive to local determinations by the micro-broker controller at the micro-broker 115, or the like, as well as various combinations thereof). The sink finite state machine 451-Sink, upon receiving a "connect data stream" command from the platform controller to connect a data stream managed by the micro-broker to a destination, transitions to a SETUP mode that creates data structures that stores and maintains relevant information about the destination. Once the micro-broker interacts with the operating system and establishes means to communicate with a destination (e.g., sockets, shared memory, or the like), the sink finite state machine 451-Sink transitions to the READY state. The platform controller could place the stream on hold, in which case the sink finite state machine 451-Sink transitions to the READY-PAUSE state. While in the READY-PAUSE state, the sink finite state machine 451-Sink will continue accumulating any message data that arrives. The data stream can go back to READY state when the platform controller continues the data stream. While in the READY state, sink finite state machine 451-Sink can transition to the ACTIVE state as stream messages fill in the buffer. This transition involves active stream buffer management. If no new messages arrive, and the buffer becomes empty, the sink finite state machine 451-Sink reverts to the READY state. While in the ACTIVE state, the sink finite state machine 451-Sink can transition to the ACTIVE-PAUSE state. In the ACTIVE-PAUSE state, the sink finite state machine 451-Sink will continue accumulating new messages. When the platform controller restarts the stream source, the sink finite state machine 451-Sink transitions back to the ACTIVE state. If the sink finite state machine 451-Sink receives the "delete data stream" command in the READY, ACTIVE. READY-PAUSE, or ACTIVE-PAUSE states, the sink finite state machine 451-Sink first transitions to the DRAIN state. The sink finite state machine 451-Sink stops processing any incoming control and data messages and closes any interfaces (e.g. outgoing socket), but maintains the messages in the buffer until they have been sent or until a timeout releases the buffer. It will be appreciated that fewer or more, as well as different, state transitions may be supported.

FIG. 4C depicts an example of a control finite state machine 451-Control configured for use by a micro-broker controller operating as a controller to coordinate a source finite state machine (e.g., source finite state machine 451-Source) and a sink finite state machine (e.g., a sink finite state machine 451-Sink) for a data stream between operators 112. The control finite state machine 451-Control is configured to support the following states: INIT, READY, PENDING SOURCES, PENDING SINKS, ACTIVE, DRAIN, and CLEANUP. It will be appreciated that fewer or more, as well as different, states may be supported. The control finite state machine 451-Control is configured to support various state transitions between the various states under various conditions (e.g., responsive to data stream control commands from a host controller via host computer control API 222 or data stream control commands from remote micro-broker controllers via micro-broker control API 221, responsive to local determinations by the micro-broker controller at the micro-broker 115, or the like, as well as various combinations thereof). When the platform controller issues a "create data stream" command to create a stream, basic data structures are created to keep track of zero or more source finite state machines and zero or more sink finite state machines. There is no source or sink at this point. The control finite state machine 451-Control is created and associated to one data stream. The platform controller will start issuing one or more commands for creating sources and sinks. As these commands arrive to the control finite state machine 451-Control, this invokes the creation of the appropriate finite state machine (namely, a source finite state machine such as presented with respect to FIG. 4A or a sink finite state machine such as presented with respect to FIG. 4B). If the first command is to create a source, the control finite state machine 451-Control transitions to the PENDING SINKS state. If the first command is to create a sink, the control finite state machine 451-Control transitions to the PENDING SOURCES state. When at least one source and one destination are available, the control finite state machine 451-Control transitions to the ACTIVE state. At this point the micro-broker will be receiving messages from one or more sources and forwarding them to one or more sinks. A "delete data stream" command can be issued in all of the states, in which case the control finite state machine 451-Control transitions to the DRAIN state. In the DRAIN state, the control finite state machine 451-Control makes ensures that all sinks are terminated, frees any resources associated with the sources, drains and then deallocates all of the buffers, and transitions to the CLEANUP state. It will be appreciated that fewer or more, as well as different, state transitions may be supported.

It will be appreciated that, although primarily presented with respect to a single source finite state machine 451-Source and a single sink finite state machine 451-Sink, micro-broker controllers of micro-brokers may be configured to support finite state machines for each of the data streams for which the micro-brokers support communication of and control of the data streams, respectively.

As discussed herein, the micro-broker controller 220 of micro-broker 115 may be configured to support finite state machines for controlling the states of operators 112 to support communication of data streams of operators 112. The finite state machines for the controlling the states of operators 112 may be configured to support various states and associated state transitions configured to support the various functions of the host computer control API 222 as discussed above (e.g., createStream$^{i,o}$, deleteStream$^{i,o}$, pauseStream$^{i,o}$, continueStream$^{i,o}$, stopStream$^{i,o}$, restartStream$^{i,o}$, addSinkStream$^o$, deleteSinkStream$^o$, addSourceStream$^i$, and deleteSourceStream$^i$, and so forth). It will be appreciated that at least some such control functions may be further understood by way of reference to FIGS. 5-11.

In at least some embodiments, a micro-broker 115 may be configured to create a data stream. A micro-broker 115 may be configured to create a data stream for an operator(s) 112 that is being instantiated (e.g., specifying the data stream(s) for the operator 112 that is being instantiated, such as the input data stream(s) that the operator 112 will consume and the output data stream(s) that the operator 112 will generate), for an existing operator(s) 112, or the like. A micro-broker 115 may be configured to create a data stream based on control information received from the platform controller 120, based on local processing performed by the micro-broker 115, or the like, as well as various combinations thereof. For example, where the operators 112 which are endpoints for the data stream are located within the same host computer 110, the micro-broker 115 may have enough information to determine the communication mode for the data stream (e.g., shared queues where the operators 112 are located within the same operator group 111 or shared memory of the host computer 110 where the operators 112 are located within different operator groups 111). For example, where the operators 112 which are endpoints for the data stream are not located within the same host computer 110, the micro-broker 115 may not have enough information to determine the communication mode for the data stream (e.g., the micro-broker 115 may not know the endpoint location(s) for the data stream (e.g., the remote operator group(s) 111 and host computer(s) 110 on which the associated operators 112 are located), the popularity of the data stream (e.g., the number of sinks for the data stream), requirements for the data stream (e.g., the latency for the receiving entities to receive data of the data stream), or the like), in which case the platform controller 120 may instruct the micro-broker 115 as to which communication mode is to be used or may provide the micro-broker 115 with additional information (e.g., information indicative of locations of the remote endpoint(s) for the data stream, information indicative of the popularity of the data stream, information indicative of requirements of the data stream, or the like) which may be used by the micro-broker 115 to determine which communication mode is to be used for the data stream.

A micro-broker 115 may be configured to create a data stream responsive to a control command received from the platform controller 120 and based on control information received from the platform controller 120 (e.g., both of which may be provided by the platform controller 120 to the host controller 118 and from the host controller 118 to the micro-broker 115). The platform controller 120 may instruct the micro-broker 115 to create a data stream (e.g., in conjunction with an operator 112 being instantiated, for an existing operator 112, or the like). The platform controller 120 may provide data stream creation information for use by the micro-broker 115 in creating the data stream. The data stream creation information may specify the communication mode to be used for the data stream (e.g., shared queues, shared memory, point-to-point connection, or message broker, which, as previously indicated, may be based on considerations such as the relative locations of the operators 112 of the data stream, the popularity of the data stream, or the like, as well as various combinations thereof). The data stream creation information may include universal resource locator(s) for the source and sink operators 112 of the data stream, where the universal resource locators may include information (e.g., the protocol to be used, endpoint address and port information, filtering criteria, or the like, as well as various combinations thereof) for use by the micro-broker 115 in creating the data stream. The data stream creation information may include other information which may be used to create the data stream. The micro-broker 115 may use the data stream creation information to create the data stream. The micro-broker 115 may perform various configuration operations for creating the data stream based on the data stream creation information (e.g., allocating buffers, setting up filters, or the like, as well as various combinations thereof). The micro-broker 115 may perform various other configuration operations, based on data stream creation information, for creating the data stream.

A micro-broker 115 may be configured to create a data stream responsive to a control command received from the platform controller 120 (e.g., which may be provided by the platform controller 120 to the host controller 118 and from the host controller 118 to the micro-broker 115) and based on local processing performed by the micro-broker 115 (as opposed to entirely under control of the platform controller 120). The platform controller 120 may instruct the micro-broker 115 to create a data stream (e.g., in conjunction with an operator 112 being instantiated, for an existing operator 112, or the like). The platform controller 120 may provide data stream creation information for use by the micro-broker 115 in establishing the data stream. The data stream creation information may include universal resource locators for the source and sink operators 112 of the data stream, where the universal resource locators may include information (e.g., the protocol to be used, endpoint address and port information, filtering criteria, or the like, as well as various combinations thereof) for use by the micro-broker 115 in creating the data stream. The data stream creation information may include other information which may be used by the micro-broker 115 to create the data stream. The micro-broker 115 may use the data stream creation information to create the data stream.

For example, the micro-broker 115 may use the information in the universal resource locators to allocate buffers and set up filters for the data stream.

For example, the micro-broker 115 may use the addresses and ports to determine the communication mode (e.g., shared queues, shared memory, point-to-point connection, or message broker) to be used for the data stream. The micro-broker 115 may maintain two lists of addresses for use in determining the path for the data stream. The two lists of addresses may include a first list of addresses (denoted as the local addresses list) that includes local operator groups 111 (located on the same host computer 110 as the operator group 111 with which the micro-broker 115 is associated) and a second list of addresses (denoted as the remote addresses list) of remote operator groups 111 (located on host computers 110 other than the host computer 110 on which the micro-broker 115 is located) that have been seen by the micro-broker 115 so far. The micro-broker 115 determines whether the stream address is the same address as the operator group 111 with which the micro-broker 115 is associated. The micro-broker 115, based on a determination that the stream address is the same address as the operator group 111 with which the micro-broker 115 is associated, creates the data stream using stream queues. The micro-broker 115, based on a determination that the stream address is not the same address as the operator group 111 with which the micro-broker 115 is associated, determines whether the stream address is in the local addresses list. The micro-broker 115, based on a determination that the stream address is in the local address list (e.g., the stream address is for a different operator group 111 on the same host computer 110), creates the data stream using shared memory of the host computer 110. The micro-broker 115, based on a determination that the stream address is not in the local address list, determines whether the stream address is in the remote addresses list. The micro-broker 115, based on a determination that the stream address is in the remote address list (e.g., the stream address is for a different operator group 111 on a different host computer 110), creates the data stream based on negotiation with the remote operator group 111 for the data stream. The negotiation may result in creation of the data stream using a point-to-point connection (which may then be established), using a message broker (where transport layer connections or other connections with the message broker may then be established), or the like. The micro-broker 115, based on a determination that the stream address is not in the remote address list either, may initiate further actions to attempt to create the data stream (e.g., contacting the platform controller 120 for assistance, attempting to contact a new micro-broker 115 (e.g., at a well-known port), or the like, as well as various combinations thereof). The micro-broker 115, based on a determination that a response is not received after the micro-broker 115 has attempted to contact a new micro-broker 115, may assume that the endpoint (e.g., sink) is an external entity and forward the data. The micro-broker 115, if a new micro-broker 115 is discovered, determines whether the new micro-broker 115 is local or remote and adds the address of the new micro-broker 115 to the appropriate address list.

Figure 5:
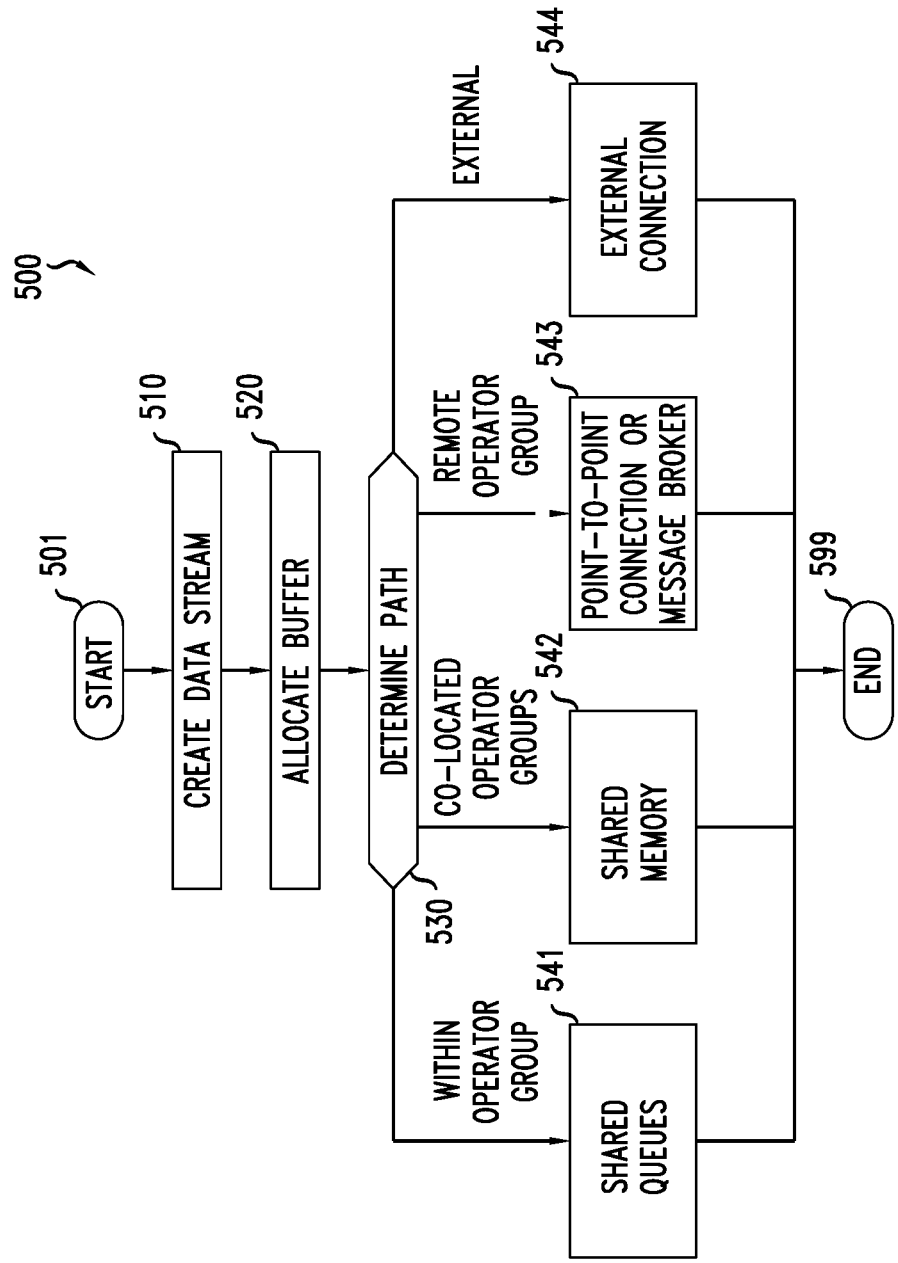
FIG. 5 depicts an example embodiment of a method for use by a micro-broker to create a data stream based on a "create data stream" command received from the platform controller.

The micro-broker 115 may be configured to create a data stream, responsive to a "create data stream" command received from the platform controller 120, as presented with respect to FIG. 5 (which illustrates at least a portion of the data stream creation functions discussed above which may be performed by the micro-broker 115 to create a data stream). Namely, FIG. 5 depicts an example embodiment of a method for use by a micro-broker to create a data stream based on a "create data stream" command received from the platform controller. It will be appreciated that, although primarily presented as being performed serially, at least a portion of the functions of method 500 may be performed contemporaneously or in a different order than as presented in FIG. 5. At block 501, method 500 begins. At block 510, the micro-broker 115 creates the data stream based on the "create data stream" command received from the platform controller 120. At block 520, a buffer is allocated for the data stream. At block 530, a path is determined for the data stream. The path for the data stream may dictate the communication mode which is to be used for the data stream and, thus, also may be considered to be a determination of the communication mode for the data stream. The path for the data stream may be an intra-operator group path (in which case, at block 541, the data stream is established using shared queues of the operator group 111), a co-located operator group path (in which case, at block 542, the data stream is established using shared memory of the host computer 110), a remote operator group path (in which case, at block 543, the data stream is established using a point-to-point connection or a message broker), or an external path (in which case, at block 544, the data stream is established using an external connection). From blocks 541-544, method 500 proceeds to block 599. At block 599, method 500 ends. It will be appreciated that, although primarily presented as alternative options, in at least some embodiments multiple communication modes may be used. It will be appreciated that, although omitted from FIG. 5 for purposes of clarity, method 500 also may include setup of filters for the data stream (e.g., filtering conditions that refer to the external behavior of the data stream, such as the number of messages, message size, source, or the like, as well as various combinations thereof).

The micro-broker 115 may use various other types of stream creation information to create the data stream, may perform various other functions to create the data stream, or the like, as well as various combinations thereof.

A micro-broker 115 may be configured to support pausing and continuing of data streams, respectively.

A micro-broker 115 may be configured to pause a stream. A micro-broker 115, when pausing a data stream, may allocate additional storage resources associated with the data stream (e.g., buffers) as the traffic of the data stream is to be preserved while the data stream is paused. The micro-broker 115 may be configured to apply a buffering policy for handling of traffic of the data stream when the buffers allocated for the data stream are filled or reach a threshold (e.g., discarding any incoming data received when the buffers are full or the threshold is satisfied, applying a first-in-first-out policy for buffered/incoming data when the buffers are full or the threshold is satisfied, or the like).

A micro-broker 115 may be configured to continue a data stream that was previously paused. A micro-broker 115 may be configured to apply a data sending policy for restarting the exchange of traffic of the data stream when the data stream is continued (e.g., sending the buffered data as fast as possible, sending the data at a uniform rate, sending the last n messages, or the like). It will be appreciated that the data sending policy that is applied by the micro-broker 115 may be the data sending policy that is expected by the receiver of the data stream that is being continued.

It will be appreciated that pausing and continuing of data streams may be supported by a micro-broker 115 based on control information received by the micro-broker 115 (e.g., "pause data stream" and "continue data stream" commands, a buffering policy for use in pausing a data stream, a data sending policy for use in continuing a data stream, or the like), based on local processing performed by the micro-broker 115, or the like, as well as various combinations thereof.

It will be appreciated that pausing and continuing of data streams may be supported by a micro-broker 115 based on control information received by the micro-broker 115 from the platform controller 120 (e.g., "pause data stream" and "continue data stream" commands) or based on control information received by the micro-broker 115 from a remote micro-broker 115 (e.g., "pause data stream" and "continue data stream" commands).

Figure 6:
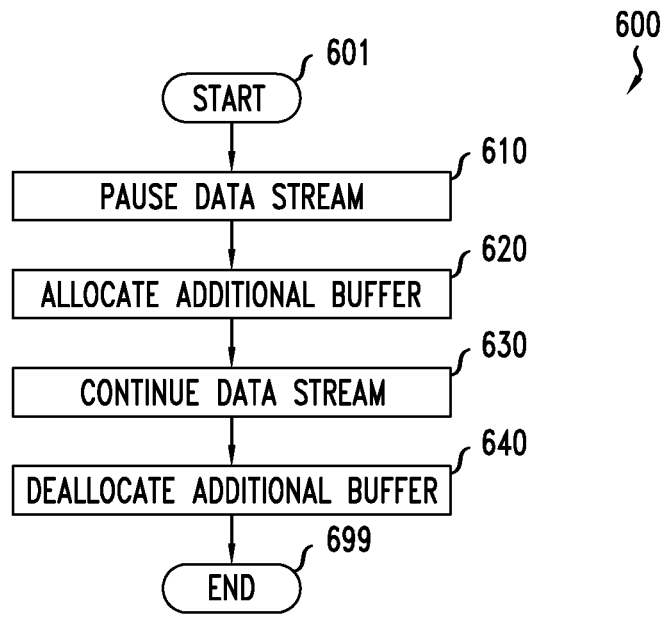
FIG. 6 depicts an example embodiment of a method for use by a micro-broker to pause and continue an incoming data stream based on "pause data stream" and "continue data stream" commands received by the micro-broker.

The micro-broker 115 may be configured to pause and continue a data stream, responsive to "pause data stream" and "continue data stream" commands received from the platform controller 120 or a remote micro-broker 115, as presented with respect to FIG. 6 (which illustrates at least a portion of the data stream pause and continue functions discussed above which may be performed by the micro-broker 115 to pause and continue a data stream). Namely, FIG. 6 depicts an example embodiment of a method for use by a micro-broker to pause and continue an incoming data stream based on "pause data stream" and "continue data stream" commands received from the platform controller. It will be appreciated that, although primarily presented as being performed serially, at least a portion of the functions of method 600 may be performed contemporaneously or in a different order than as presented in FIG. 6. At block 601, method 600 begins. At block 610, the micro-broker 115 pauses the data stream based on the "pause data stream" command received from the platform controller 120. At block 620, the micro-broker 115 allocates an additional buffer to buffer data of the data stream while the data stream is paused. At block 630, the micro-broker 115 continues the data stream based on the "continue data stream" command received from the platform controller 120. At block 640, the micro-broker 115 deallocates the additional buffer used to buffer data of the data stream while the data stream was paused. It is noted that the additional buffer may be deallocated after a determination that the data of the additional buffer has been sent. At block 699, method 600 ends. It is noted that the decision to allocate or deallocate buffer space also may be determined by monitoring the actual buffer size and allocating or selectively dumping based on the monitoring of the actual buffer size. It is further noted that, if a "continue data stream" command is issued, the buffer is typically adjusted after a delay (e.g., after the additional contents that accumulated during pause have been transferred to the destination(s)).

The micro-broker 115 may perform various other functions to pause the data stream or to support pausing the data stream, may perform various other functions to continue the data stream or to support continuing the data stream, or the like, as well as various combinations thereof.

A micro-broker 115 may be configured to support stopping and restarting of data streams, respectively.

A micro-broker 115 may be configured to stop a data stream. A micro-broker 115, when stopping a data stream, may deallocate storage resources associated with the data stream (e.g., buffers, stream queues, or the like). A micro-broker 115 may be configured to discard any traffic coming or going through a data stream once the data stream has been stopped. It will be appreciated that, when a data stream is stopped by a micro-broker 115, the stream definition (e.g., universal resource locator or the like) still exists for the data stream at the micro-broker 115 and, thus, that the micro-broker 115 can restart the data stream again.

A micro-broker 115 may be configured to restart a data stream that was previously stopped. A micro-broker 115 may support restarting a data stream by allocating memory resources (e.g., a new buffer, a new stream queue, or the like) if needed. It will be appreciated that, since the stream definition (e.g., universal resource locator or the like) still exists (and has not changed) for the data stream at the micro-broker 115, the micro-broker 115 can restart the data stream again while continuing to transfer data to the same sink(s) as before the data stream was stopped.

It will be appreciated that stopping and restarting of data streams may be supported by a micro-broker 115 based on control information received from the platform controller 120 (e.g., "stop data stream" and "restart data stream" commands or the like), based on local processing performed by the micro-broker 115, or the like, as well as various combinations thereof.

Figure 7:
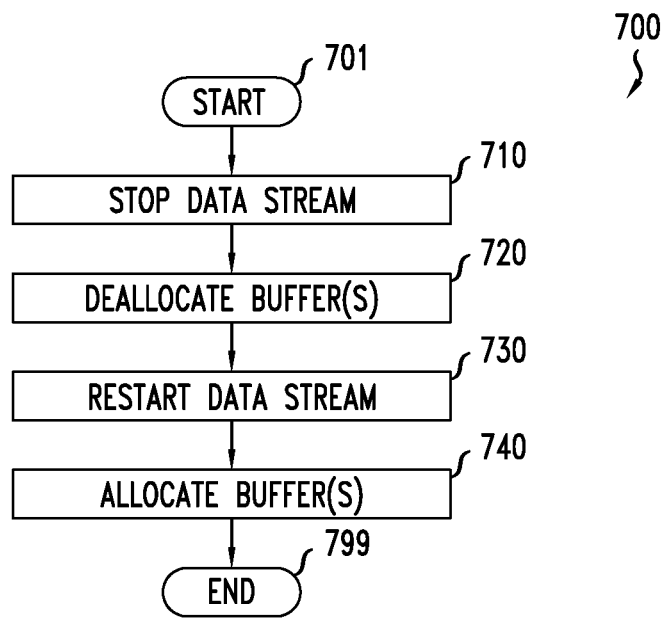
FIG. 7 depicts an example embodiment of a method for use by a micro-broker to stop and restart an incoming data stream based on "stop data stream" and "restart data stream" commands received from the platform controller.

The micro-broker 115 may be configured to stop and restart a data stream, responsive to "stop data stream" and "restart data stream" commands received from the platform controller 120 (e.g., which may be provided by the platform controller 120 to the host controller 118 and from the host controller 118 to the micro-broker 115), as presented with respect to FIG. 7 (which illustrates at least a portion of the data stream stop and restart functions discussed above which may be performed by the micro-broker 115 to stop and restart a data stream). Namely, FIG. 7 depicts an example embodiment of a method for use by a micro-broker to stop and restart an incoming data stream based on "stop data stream" and "restart data stream" commands received from the platform controller. It will be appreciated that, although primarily presented as being performed serially, at least a portion of the functions of method 700 may be performed contemporaneously or in a different order than as presented in FIG. 7. At block 701, method 700 begins. At block 710, the micro-broker 115 stops the data stream based on the "stop data stream" command received from the platform controller 120. At block 720, the micro-broker 115 deallocates any buffers previously being used to buffer data of the data stream. At block 730, the micro-broker 115 restarts the data stream based on the "restart data stream" command received from the platform controller 120. At block 740, the micro-broker 115 allocates buffers configured to buffer data of the data stream. At block 799, method 700 ends. It is noted that the decision to allocate or deallocate buffer space also may be determined by monitoring the actual buffer size and allocating or selectively dumping based on the monitoring of the actual buffer size.

The micro-broker 115 may perform various other functions to stop the data stream or to support stopping of the data stream, may perform various other functions to restart the data stream or to support restarting the data stream, or the like, as well as various combinations thereof.

A micro-broker 115 may be configured to support merging and cloning of incoming and outgoing data streams, respectively.

A micro-broker 115 may merge data streams, to form a merged stream, by interspersing data sent by two or more sources (e.g., operators 112 or other sources). A micro-broker 115 may support merging of data streams by allocating additional incoming buffers (as more data will become available) where the additional incoming buffers may be assigned to the data received from the multiple sources for the merged stream. It will be appreciated that merging of streams may be applied within various other contexts.

A micro-broker 115 may clone a stream to form two or more cloned streams. A micro-broker 115 may support cloning of data streams by allocating additional outgoing buffers (as more data will become available) where the additional outgoing buffers may be assigned to the data of the cloned data streams that is to be provided toward multiple sinks. It will be appreciated that cloning of data streams allows a micro-broker 115 to forward the data stream to two or more sinks (e.g., operators 112 or other sinks). It will be appreciated that cloning may be used to support stream redirection (e.g., for a stream being provided from operator 1 to operator 2, cloning the data stream such that it is provided from operator 1 to operators 2 and 3). It will be appreciated that cloning may be used to support data stream redirection that is applied within the context of operator migration (e.g., for migration of an operator 2 from an original operator 2 to a new operator 2: instantiating the new operator 2, cloning the data stream such that it is provided to the original operator 2 and the new operator 2, and deleting the data stream from operator 1 to the original operator 2 while allowing the data stream to continue to flow from operator 1 to the new operator 2, and terminating the original operator 2). It will be appreciated that cloning/redirection/migration of the stream may be transparent to the source of the data stream. It will be appreciated that cloning of streams may be applied within various other contexts.

It will be appreciated that merging and cloning of streams may be supported by a micro-broker 115 based on control information received from the platform controller 120 (e.g., "merge data stream" and "clone data stream" commands or the like), based on local processing performed by the micro-broker 115, or the like, as well as various combinations thereof.

Figure 8:
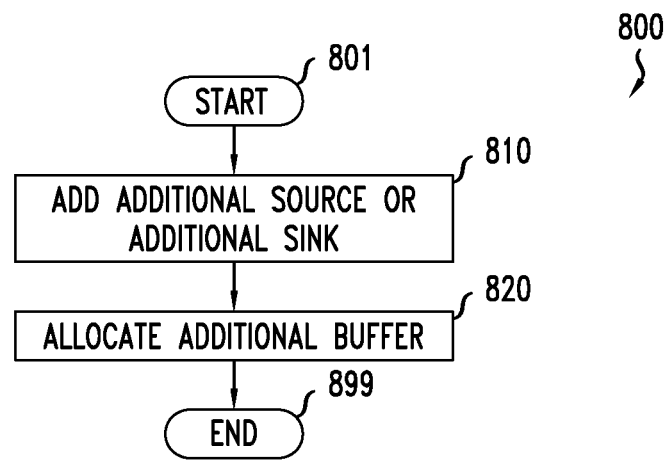
FIG. 8 depicts an example embodiment of a method for use by a micro-broker to merge or clone data streams based on "merge data stream" and "clone data stream" commands received from the platform controller.

The micro-broker 115 may be configured to merge or clone data streams, responsive to "merge data stream" and "clone data stream" commands received from the platform controller 120 (e.g., which may be provided by the platform controller 120 to the host controller 118 and from the host controller 118 to the micro-broker 115), as presented with respect to FIG. 8 (which illustrates at least a portion of the data stream merge and clone functions discussed above which may be performed by the micro-broker 115 to merge and clone data streams). Namely, FIG. 8 depicts an example embodiment of a method for use by a micro-broker to merge or clone data streams based on "merge data stream" and "clone data stream" commands received from the platform controller. It will be appreciated that, although primarily presented as being performed serially, at least a portion of the functions of method 800 may be performed contemporaneously or in a different order than as presented in FIG. 8. At block 801, method 800 begins. At block 810, the micro-broker 115 adds an additional source (e.g., in the case of merging data streams to form a merged data stream) or an additional sink (e.g., in the case of cloning a data stream to form cloned data streams) based on the "merge data stream" or "clone data stream" command received from the platform controller 120. At block 820, the micro-broker 115 allocates an additional buffer (e.g., an incoming buffer in the case of merging data streams to form a merged data stream or an outgoing buffer in the case of cloning a data stream to form cloned data streams). At block 899, method 800 ends.

The micro-broker 115 may perform various other functions to merge data streams or to support merging of data streams, may perform various other functions to clone data streams or to support cloning of data streams, or the like, as well as various combinations thereof.

A micro-broker 115 may be configured to support disconnection or deletion of outgoing data streams, respectively.

A micro-broker 115 may be configured to disconnect a data stream that was being provided by the micro-broker 115 to a remote operator 112, based on a request from a remote micro-broker 115 associated with the remote operator 112 (e.g., which may be sent via the micro-broker control API 221), such that the data stream is no longer provided to the remote operator 112. A micro-broker 115, when disconnecting a data stream, may deallocate storage resources associated with the data stream (e.g., buffers, stream queues, or the like). A micro-broker 115 may be configured to discard any traffic coming or going through a data stream once the data stream has been disconnected. It will be appreciated that, when a data stream is disconnected by a micro-broker 115, the stream definition (e.g., universal resource locator or the like) still exists for the data stream at the micro-broker 115 and, thus, that the micro-broker 115 can connect the data stream again.

A micro-broker 115 may be configured to delete a data stream. A micro-broker 115 may be configured to delete a data stream based on control information (e.g., a "delete data stream" command) received from the platform controller 120 (e.g., which may be provided by the platform controller 120 to the host controller 118 and from the host controller 118 to the micro-broker 115), based on local processing performed by the micro-broker 115, or the like, as well as various combinations thereof. A micro-broker 115, when deleting a data stream, may deallocate storage resources associated with the data stream (e.g., buffers, stream queues, or the like). A micro-broker 115 may be configured to discard any traffic coming or going through a data stream once the data stream has been deleted. It will be appreciated that, when a data stream is deleted by a micro-broker 115, the stream definition (e.g., universal resource locator or the like) may not be retained at the micro-broker 115.

It will be appreciated that stopping and restarting of data streams may be supported by a micro-broker 115 based on control information received by the micro-broker 115 (e.g., "disconnect data stream" and "delete data stream" commands or the like), based on local processing performed by the micro-broker 115, or the like, as well as various combinations thereof.

Figure 9:
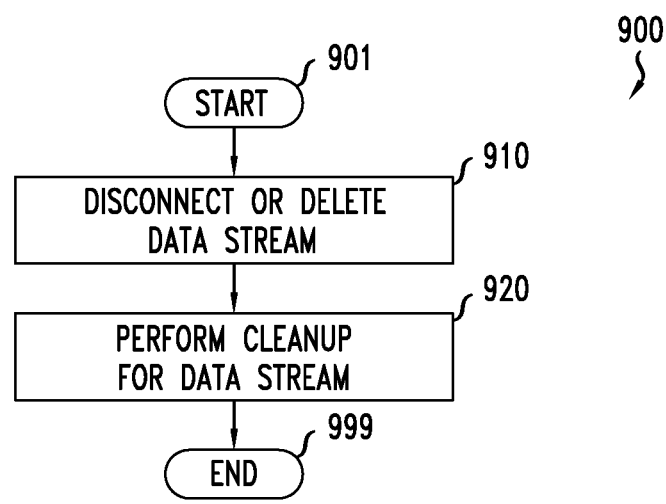
FIG. 9 depicts an example embodiment of a method for use by a micro-broker to disconnect or delete a data stream based on "disconnect data stream" or "delete data stream" commands received by the micro-broker.

The micro-broker 115 may be configured to disconnect or delete a data stream, responsive to "disconnect data stream" or "delete data stream" commands, respectively, as presented with respect to FIG. 9 (which illustrates at least a portion of the data stream disconnect and delete functions discussed above which may be performed by the micro-broker 115 to disconnect or delete a data stream). Namely, FIG. 9 depicts an example embodiment of a method for use by a micro-broker to disconnect or delete a data stream based on "disconnect data stream" or "delete data stream" commands received by the micro-broker. It will be appreciated that, although primarily presented as being performed serially, at least a portion of the functions of method 900 may be performed contemporaneously or in a different order than as presented in FIG. 9. At block 901, method 900 begins. At block 910, the micro-broker 115 disconnects the data stream (e.g., based on the "disconnect data stream" command received from a remote micro-broker 115) or deletes the data stream (e.g., based on the "delete data stream" command received from the platform controller 120). At block 920, the micro-broker 115 performs cleanup for the data stream. The cleanup may include deallocating any buffers previously being used to buffer data of the data stream, cleaning up sockets, cleaning up shared memory, cleaning up queues, or the like, as well as various combinations thereof. At block 999, method 900 ends.

The micro-broker 115 may perform various other functions to disconnect the data stream or to support disconnection of the data stream, may perform various other functions to delete the data stream or to support deletion of the data stream, or the like, as well as various combinations thereof.

The micro-broker 115 may be configured to support various other data stream control functions for providing data stream control operations presented herein, may be configured to support various other data stream control operations (e.g., data rate changes or the like), or the like, as well as various combinations thereof.

The micro-broker 115 may be configured to support various other functions for supporting communications of and control over data streams.

The micro-broker 115 may be implemented in various ways. In at least some embodiments, the micro-broker 115 may be implemented as portion of a communication stack of the operator group 111 with which the micro-broker 115 is associated. In at least some such embodiments, the micro-broker 115 may be configured to communicate based on various protocols which may be supported at various communication layers of the communication stack. In at least some embodiments, the micro-broker 115 may be implemented as a library configured to enable operators to communicate. In at least some such embodiments, the micro-broker library also may include API functions of the micro-broker control API 221 for enabling the micro-broker library to process commands received from remote micro-brokers 115 via the micro-broker control API 221, API functions of the host computer control API 222 for enabling the micro-broker library to process commands received from the platform controller 120 via the host computer control API 222, or the like, as well as various combinations thereof. In at least some embodiments, the micro-broker 115 may include a micro-broker controller configured to provide various control functions of the micro-broker 115 (e.g., control functions for supporting communications of and control over data streams). In at least some embodiments, the micro-broker controller of the micro-broker 115 may be configured to support communications of data streams based on various communication modes using various communication layers of the communication stack. In at least some embodiments, the micro-broker controller of the micro-broker 115 may be configured to support control over data streams based on control communications with remote micro-brokers 115 (e.g., using API functions of the micro-broker control API 221), based on control communications with the host controller 118 of the host computer 110 (e.g., using API functions of the host computer control API 222), based on control communications with the platform controller 120 via the host controller 118 of the host computer 110 (e.g., using API functions of the host computer control API 222), or the like, as well as various combinations thereof. In at least some such embodiments, the micro-broker controller of the micro-broker 115 may be configured to operate based on use of one or more finite state machines configured to provide various control functions of the micro-broker 115 (e.g., control functions for supporting communications of and control over data streams). It will be appreciated that implementation of the micro-broker 115 may support various other functions, may include various other elements, or the like, as well as various combinations thereof. An example embodiment of a micro-broker configured to support communications of and control over data streams is presented with respect to FIG. 10.

Figure 10:
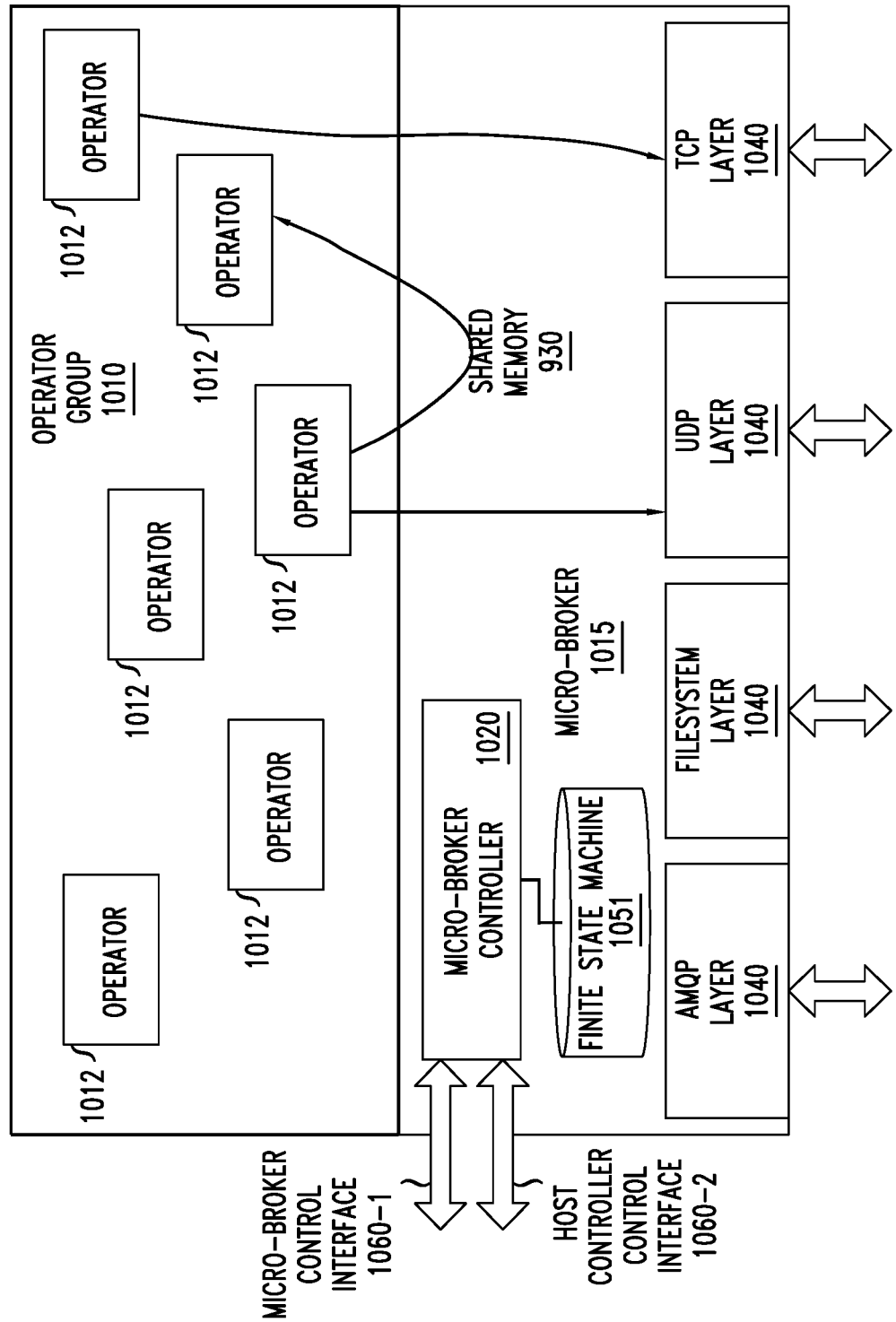
FIG. 10 depicts an example embodiment of a host computer including an operator group having an associated micro-broker configured to support communications of and control of data streams of operators of the operator group.

FIG. 10 depicts an example embodiment of a host computer including an operator group having an associated micro-broker configured to support communications of and control of data streams of operators of the operator group.

The host computer 1000 includes an operator group 1010 and a micro-broker 1015. The operator group 1010 includes a set of operators 1012. The micro-broker 1015 includes a micro-broker controller 1020 and associated finite state machine 1051, a shared memory 1030, a set of data communication layers 1040 (illustratively, a TCP layer 1040-1, a UDP layer 1040-2, a filesystem layer 1040-3, and an AMQP layer 1040-4), and a set of control interfaces 1060 (illustratively, a micro-broker control interface 1060-1 between the micro-broker controller 1020 and remote micro-brokers (which are omitted for purposes of clarity) and a host computer control interface between the micro-broker controller 1020 and the host controller of the host computer 1000 (which is omitted for purposes of clarity)).

The micro-broker 1015 is configured to support communications of data streams of operators 1012 of the operator group 1010. The micro-broker 1015 is configured to support communications of operators 1012 of the operator group 1010 based on use of various communication modes. The use of the shared memory 1030 of the micro-broker 1015 to support communications between operators 1012 within the operator group 1010 is illustrated. The use of shared memory of the host computer to support communications between operators 1012 and other operators of other operator groups of the host computer is omitted for purposes of clarity. The use of point-to-point TCP and UDP connections to support communications by operators 1012 of the operator group 1010 with operators located in other host computers, without using a message broker, is illustrated. The use of point-to-point connections to support communications by operators 1012 of the operator group 1010 with operators located in other host computers, using a message broker, is omitted for purposes of clarity (although it will be appreciated that AMQP interface 1040-4 may be used for this purpose).

The micro-broker 1015 is configured to support control of data streams of operators 1012 of the operator group 1010. The micro-broker controller 1050 of micro-broker 1015 may be configured to support control of data streams of operators 1012 of the operator group 1010. The micro-broker controller 1020 of micro-broker 1015 may be configured to support control of data streams of operators 1012 of the operator group 1010 using the micro-broker control interface 1060-1 between the micro-broker controller 1020 and remote micro-brokers (e.g., using API functions of the micro-broker control API 221) and the host computer control interface between the micro-broker controller 1020 and the host controller of the host computer on which operator group 1010 is hosted (e.g., using API functions of the host computer control API 222). The operation of the micro-broker controller 1020 of micro-broker 1015 to support control of data streams of operators 1012 of the operator group 1010 may be further understood by way of reference to FIG. 11 (which illustrates examples of control commands which may be exchanged by micro-broker controller 1020 of micro-broker 1015 with remote micro-brokers (micro-broker controllers of remote micro-brokers) using API functions of the micro-broker control API 221 and commands which may be exchanged by micro-broker controller 1020 of micro-broker 1015 with the host controller of the host computer on which operator group 1010 is hosted using API functions of the host computer control API 222) and FIGS. 11A and 11B (which illustrate examples of finite state machines which may be used to provide the finite state machine 1051 supported and used by micro-broker controller 1020).

It will be appreciated that host computer 1000, as well as various elements of host computer 1000 (e.g., operator group 1010, micro-broker 1015, micro-broker controller 1020, or the like) may be implemented in various other way.

Figure 11:
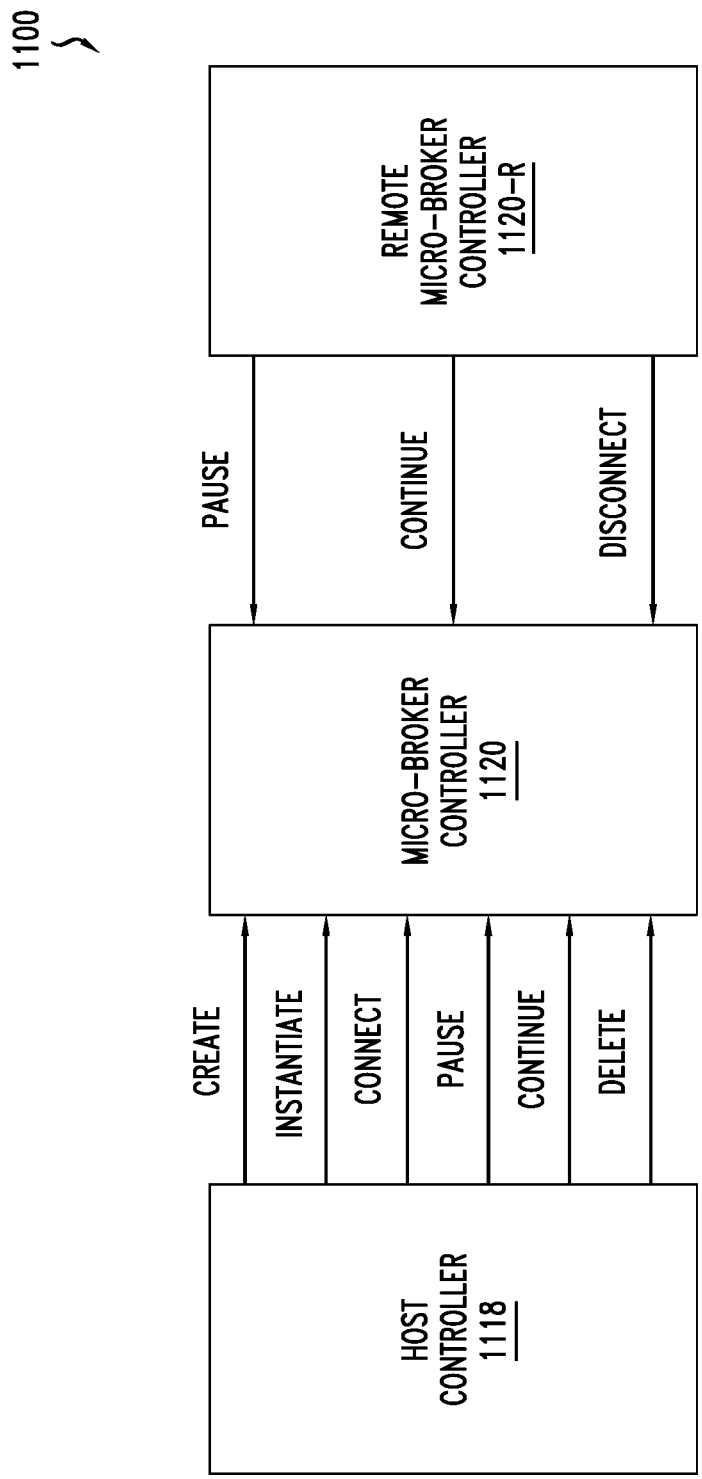
FIG. 11 depicts an example embodiment of a control architecture for use by a micro-broker controller of a micro-broker to support control of data streams of operators of an operator group.

FIG. 11 depicts an example embodiment of a control architecture for use by a micro-broker controller of a micro-broker to support control of data streams of operators of an operator group.

The control architecture 1100 includes a host controller 1118, a micro-broker controller 1120, and a remote micro-broker controller 1120-R.

The micro-broker controller 1120 is configured to receive, from host controller 1118 based on a host computer control API (e.g., host computer control API 222), data stream control commands configured to instruct the micro-broker controller 1120 to control data streams of operators of the operator group with which the micro-broker is associated (e.g., Create, Instantiate, Connect, Pause, Continue, Delete, or the like). The micro-broker controller 1120 is configured to perform data stream control functions based on the data stream control commands from host controller 1118. It will be appreciated that at least a portion of the data stream control commands received from the host controller 1118 may originate from a platform controller such as platform controller 120. It will be appreciated that various other data stream control commands may be supported by the micro-broker controller 1120 on the interface between the micro-broker controller 1120 and the host controller 1118.

The micro-broker controller 1120 is configured to receive, from remote micro-broker controller 1120-R based on a micro-broker control API (e.g., micro-broker control API 221), data stream control commands configured to instruct the micro-broker controller to control data streams of operators of the operator group with which the micro-broker is associated (e.g., Pause, Continue, Disconnect, or the like). The micro-broker controller 1120 is configured to perform data stream control functions based on the data stream control commands from remote micro-broker controller 1120-R. It will be appreciated that various other data stream control commands may be supported by the micro-broker controller 1120 on the interface between the micro-broker controller 1120 and the remote micro-broker controller 1120-R. It will be appreciated that, although a single remote micro-broker controller 1120-R is presented for purposes of clarity, micro-broker controller 1120 may be configured to communicate with any suitable number of remote micro-broker controllers 1120 for purposes of supporting control of data streams of operators of an operator group.

The micro-broker controller 1120 is configured to determine, based on communications between micro-broker controller 1120 and remote micro-broker controller 1120-R (as well as other micro-broker controllers of other micro-brokers, which are omitted for purposes of clarity) based on a micro-broker control API (e.g., based on communications such as negotiations, communications of data streams, control of data streams, or the like), information indicative of network quality (e.g., statics, status information, or the like, as well as various combinations thereof). The micro-broker controller 1120 is configured to perform data stream control functions based on the information indicative of network quality (e.g., determining communication modes for data streams, adding new sources or sinks for data streams, migrating data streams, or the like, as well as various combinations thereof).

It will be appreciated that the control architecture 1100 may be implemented in various other ways and may be configured to support various other control functions.

Figure 12:
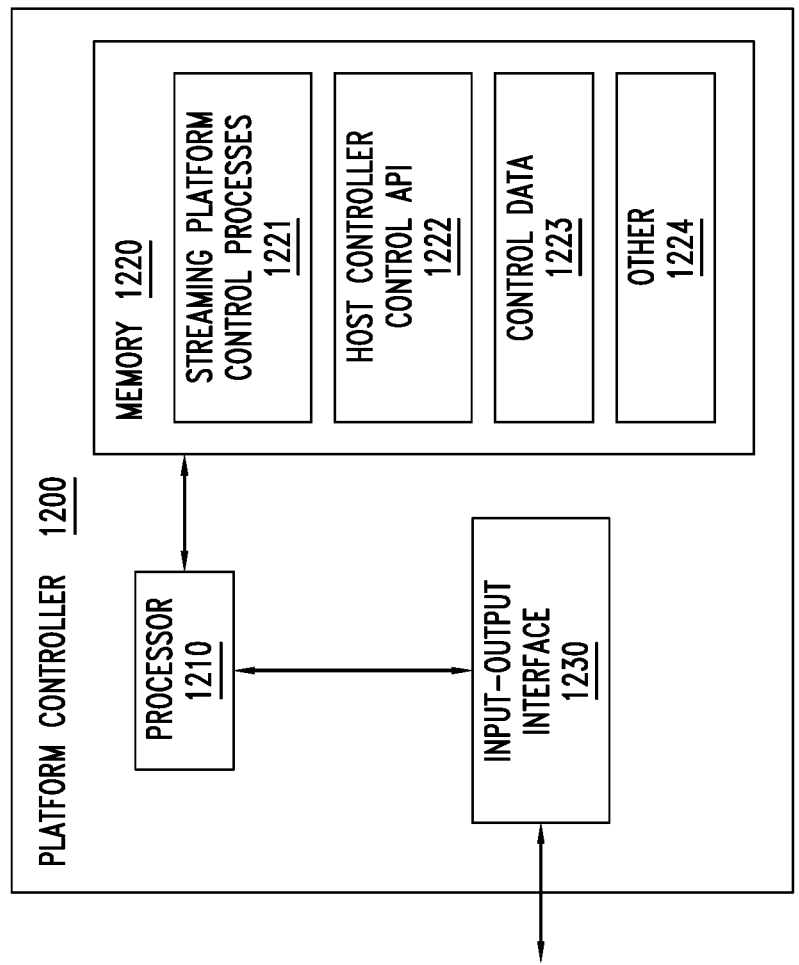
FIG. 12 depicts an example embodiment of a platform controller configured to support control of data streams of the stream processing platform.

FIG. 12 depicts an example embodiment of a platform controller configured to support control of data streams of the stream processing platform. The platform controller 1200 of FIG. 12 may be used as platform controller 120 of FIG. 1 and, thus, may be configured to provide various functions presented herein as being supported by platform controller 120 of FIG. 1. The platform controller 1200 includes a processor 1210, a memory 1220, and an input-output (I/O) interface 1230. The processor 1210 is communicatively connected to the memory 1220 and the I/O interface 1230. The processor 1210 is configured to provide processing for supporting various stream processing platform control functions. The memory 1220 includes stream processing platform control processes 1221 which may be executed by processor 1210 to provide various stream processing platform control functions, a host computer control API 1222 suitable for use as host computer control API 222 presented with respect to FIG. 2, control data 1223 configured for use in provide various stream processing platform control functions or resulting from providing various stream processing platform control functions, and so forth (e.g., represented by other programs and data 1224). The I/O interface 1230 is configured to support communications between platform controller 1200 and elements of the stream processing platform (e.g., host computers 110, micro-brokers 115, and so forth) for supporting various stream processing platform control functions. It will be appreciated that the platform controller 1200 may be implemented in various other ways.

Figure 13:
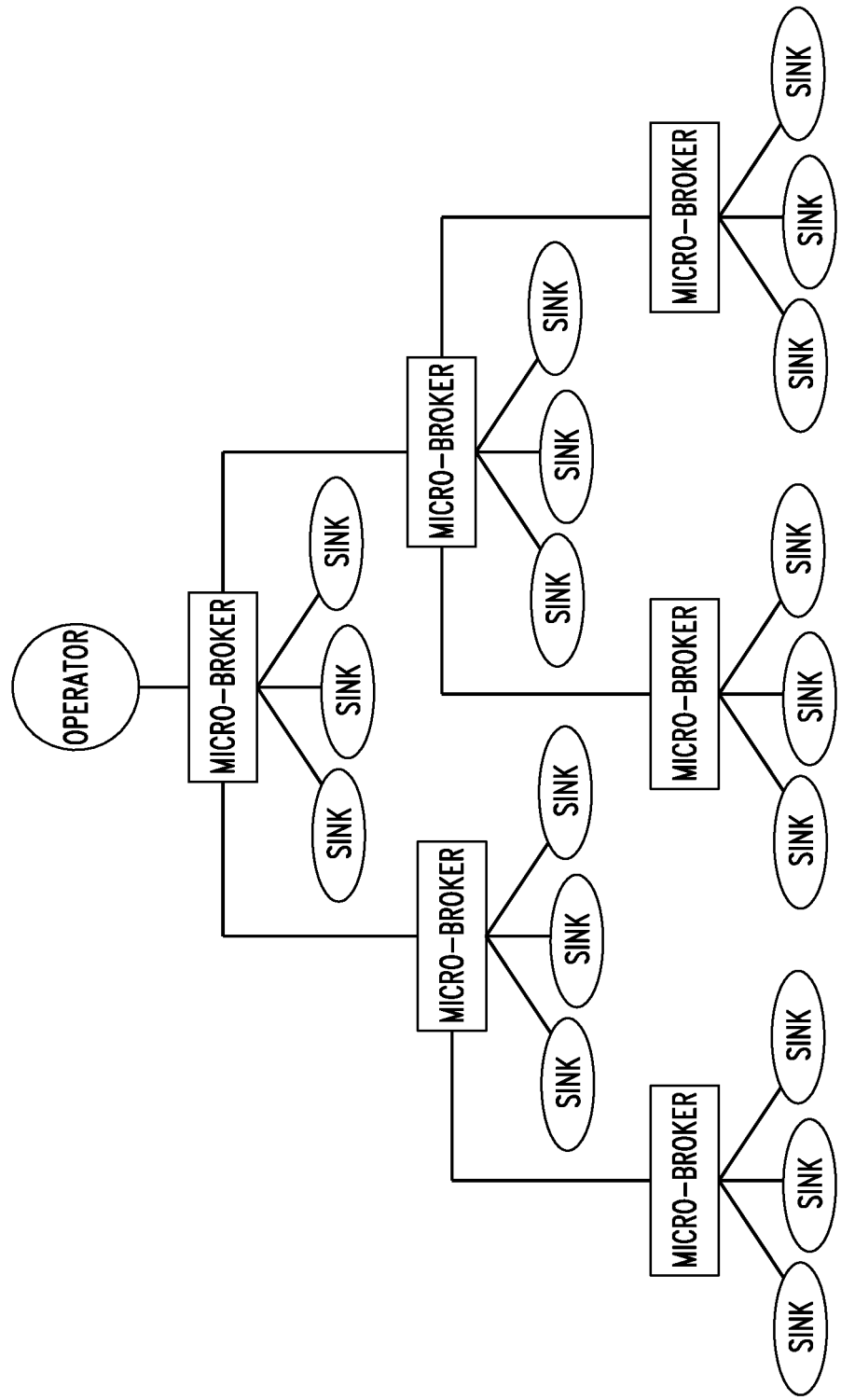
FIG. 13 depicts an example of a hierarchy of micro-brokers configured to support splitting of data streams for scalability in supporting a relatively large number of data stream sinks.

FIG. 13 depicts an example of a hierarchy of micro-brokers configured to support splitting of data streams for scalability in supporting a relatively large number of data stream sinks. The hierarchy of micro-brokers includes a first micro-broker configured to receive a data stream from an operator and to split the data stream into five duplicate data streams which are provided to three sink elements and two micro-brokers located at a next layer of the hierarchy of micro-brokers, respectively. The two micro-brokers located at a next layer of the hierarchy of micro-brokers receive the data streams and further split the data streams into duplicate data streams which are then provided to other sink elements and other micro-brokers. In this manner, micro-brokers may be used to efficiently scale a single data stream to a large number of sinks. The micro-brokers can form this overlay network of forwarding micro-brokers on its own, in a distributed fashion, without the direct intervention of the platform controller. As the overlay network of micro-brokers expands, additional computational and network resources are used by each micro-broker. It is noted that the platform controller receives feedback of resource usage from host controllers and, thus, the platform controller does not allocate the network overlay of micro-brokers (although it can make decisions taking these network overlays into consideration).

Figure 14:
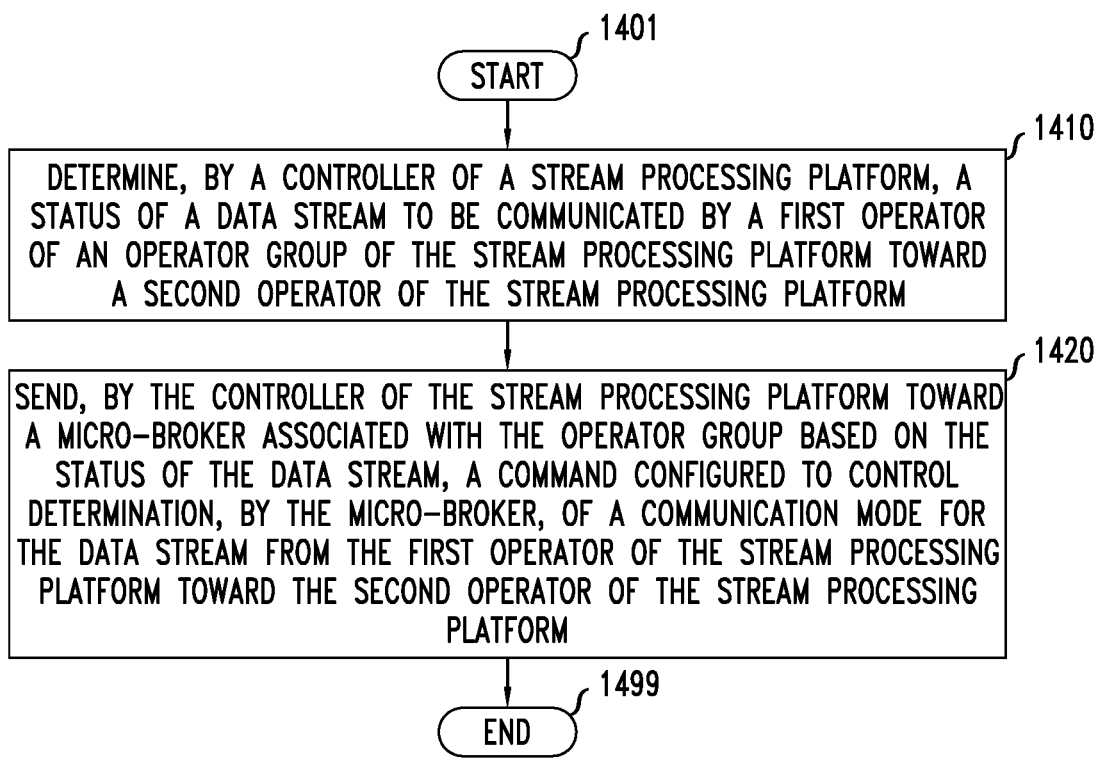
FIG. 14 depicts an example embodiment of a method for use by a platform controller of the stream processing platform.

FIG. 14 depicts an example embodiment of a method for use by a platform controller of the stream processing platform. It will be appreciated that, although primarily presented as being performed serially, at least a portion of the functions of method 1400 may be performed contemporaneously or in a different order than as presented in FIG. 14. At block 1401, method 1400 begins. At block 1410, determine, by a controller of a stream processing platform, a status of a data stream to be processed by an operator of an operator group of the stream processing platform. At block 1420, send, by the controller of the stream processing platform toward a micro-broker associated with the operator group of the data stream based on the status of the data stream, a command configured to control determination, by the micro-broker, of a communication mode for the data stream to be communicated by the first operator toward the second operator. At block 1499, method 1400 ends.

Figure 15:
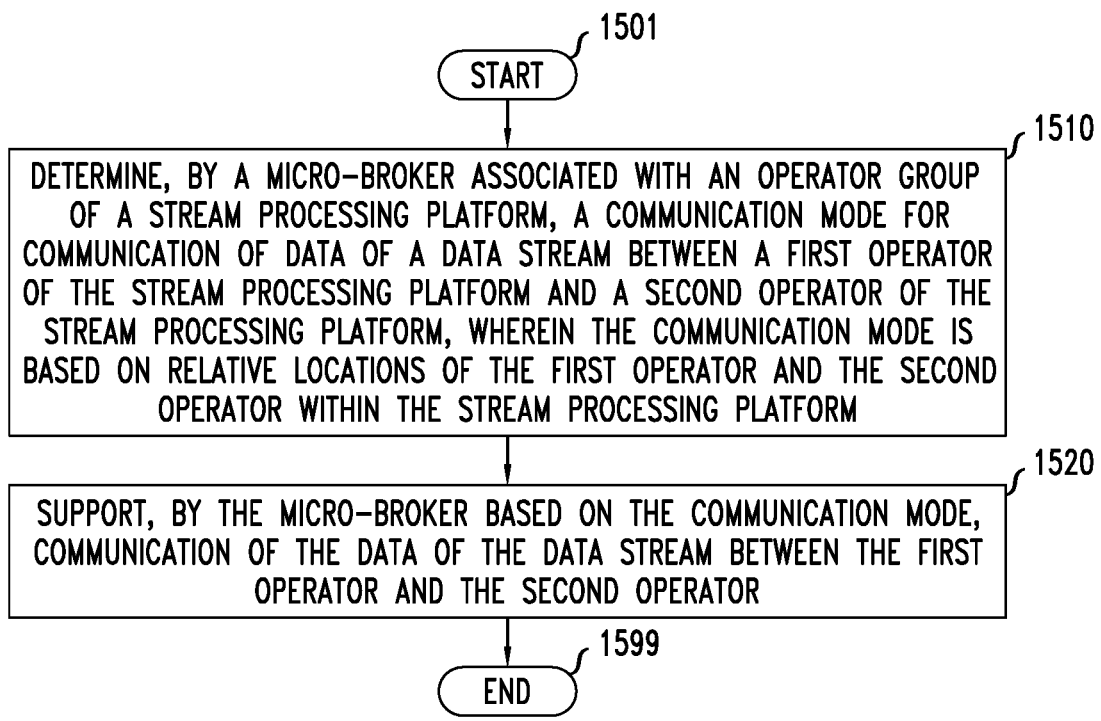
FIG. 15 depicts an example embodiment of a method for use by a micro-broker of the stream processing platform.

FIG. 15 depicts an example embodiment of a method for use by a micro-broker of the stream processing platform. It will be appreciated that, although primarily presented as being performed serially, at least a portion of the functions of method 1500 may be performed contemporaneously or in a different order than as presented in FIG. 15. At block 1501, method 1500 begins. At block 1510, determine, by a micro-broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform. At block 1520, support, by the micro-broker based on the communication mode, communication of the data of the data stream between the first operator and the second operator. At block 1599, method 1500 ends.

Various example embodiments for supporting communications for a stream processing platform may provide various advantages or potential advantages. For example, various example embodiments for supporting communications for a stream processing platform may provide improved exchange of data of data streams between operators based on use of a peer-to-peer solution, for at least some of the data streams, which allows data streams to directly flow from one operator to the next while exploiting locality (e.g., memory-based queues, shared memory, or the like). For example, various example embodiments for supporting communications for a stream processing platform may provide improved exchange of data of data streams between operators under various conditions (e.g., different relative operator locations, operator characteristics, stream characteristics, system constraints, changing communication conditions, or the like, as well as various combinations thereof). For example, various example embodiments for supporting communications for a stream processing platform may provide improved exchange of data of data streams between operators running within the same machine (within the same operator group or between operator groups). For example, various example embodiments for supporting communications for a stream processing platform may provide improved exchange of data of data streams between operators running in different machines. For example, various example embodiments for supporting communications for a stream processing platform, by supporting use of different communication modes for different data streams, spreads traffic of the data streams across various hardware resources of the host computer (e.g., memory, NIC, or the like). For example, various example embodiments for supporting communications for a stream processing platform, by supporting use of different communication modes under different conditions, may lessen the reliance on use of a message broker to support communication of data of the data streams (and, thus, reduce the potential for problems which may arise due to certain issues often associated with use of a message broker, such as additional delay compared to point-to-point communications or other more localized communication modes (e.g., the message broker will communicate via the TCP stack, the message broker may need to evaluate user access and data subscription criteria, and so forth), vulnerability of the message broker as a single point of failure (and any overhead associated with alleviating such vulnerability (e.g., data partitioning, replication, federation, or the like), or the like). For example, various example embodiments for supporting communications for a stream processing platform may support use of a micro-broker API by the stream processing platform controller and the micro-brokers such that data streams may be controlled in various ways (e.g., instantiated, paused, continued, stopped, started, filtered, migrated, cloned, or the like) which may provide various positive impacts (e.g., resource utilization, versatility, or the like). For example, various example embodiments for supporting communications for a stream processing platform may support various security-related features, such as access control (which is a line of defense against denial-of-service attacks), secured connections, or the like, as well as various combinations thereof. For example, various example embodiments for supporting communications for a stream processing platform may support migration of operators in various scenarios (e.g., efficiency scenarios, failure scenarios, maintenance scenarios in the case of long-lived operators, or the like). Various example embodiments for supporting communications for stream processing platforms may provide various other advantages or potential advantages.

Figure 16:
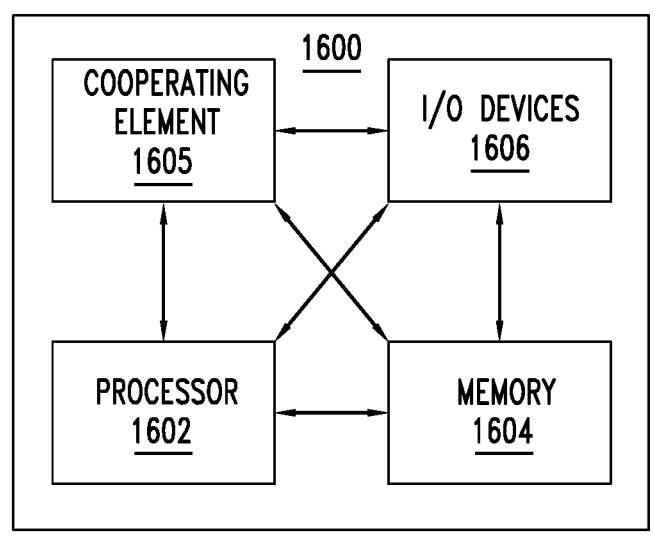
FIG. 16 depicts a high-level block diagram of a computer suitable for use in performing various functions presented herein.

FIG. 16 depicts a high-level block diagram of a computer suitable for use in performing various functions described herein.

The computer 1600 includes a processor 1602 (e.g., a central processing unit (CPU), a processor having a set of processor cores, a processor core of a processor, or the like) and a memory 1604 (e.g., a random access memory (RAM), a read-only memory (ROM), or the like). The processor 1602 and the memory 1604 may be communicatively connected.

The computer 1600 also may include a cooperating element 1605. The cooperating element 1605 may be a hardware device. The cooperating element 1605 may be a process that can be loaded into the memory 1604 and executed by the processor 1602 to implement functions as discussed herein (in which case, for example, the cooperating element 1605 (including associated data structures) can be stored on a non-transitory computer-readable storage medium, such as a storage device or other storage element (e.g., a magnetic drive, an optical drive, or the like)).

The computer 1600 also may include one or more input/output devices 1606. The input/output devices 1606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1600 of FIG. 16 may represent a general architecture and functionality suitable for implementing functional elements described herein, portions of functional elements described herein, or the like, as well as various combinations thereof. For example, computer 1600 may provide a general architecture and functionality that is suitable for implementing one or more elements presented herein, such as a host computer 110, a portion of a host computer 110, a micro-broker 115, a portion of a micro-broker 115, platform controller 120, a portion of platform controller 120, or the like.

It will be appreciated that various functions presented herein may be implemented by an apparatus where the apparatus includes at least one processor and at least one memory including computer program code and where the at least one memory and the computer program code are configured to, with the at least one processor, cause the apparatus to perform the various functions.

It will be appreciated that various functions presented herein may be implemented in software (e.g., via implementation of software on one or more processors, for executing on a general-purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      determine, by a broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform, wherein the first operator and the second operator are co-located within the operator group, wherein the communication mode includes a shared queue of the broker; and
      support, by the broker based on the communication mode, communication of the data of the data stream between the first operator and the second operator.

2. The apparatus of claim 1, wherein the at least one memory and the computer program code are configured to, with the at least one processor, cause the apparatus to at least:
   determine, by the broker associated with the operator group of the stream processing platform, a second communication mode for communication of data of a second data stream between a third operator of the stream processing platform and a fourth operator of the stream processing platform, wherein the communication mode is based on relative locations of the third operator and the fourth operator within the stream processing platform; and
   support, by the broker based on the second communication mode, communication of the data of the second data stream between the third operator and the fourth operator.

3. The apparatus of claim 2, wherein the second communication mode includes one of a shared queue, a shared memory, a point-to-point connection, or a message broker.

4. The apparatus of claim 2, wherein the operator group is hosted on a host computer, wherein the third operator is located within the operator group and the fourth operator is located within a second operator group hosted on the host computer, wherein the second communication mode includes a shared memory of the host computer.

5. The apparatus of claim 2, wherein the operator group is hosted on a host computer, wherein the third operator is located within the operator group, wherein the fourth operator is located within the operator group or located within a second operator group hosted on the host computer, wherein the second communication mode includes a communication mode that does not use a transport layer of a communication stack of the host computer.

6. The apparatus of claim 2, wherein the operator group is hosted on a host computer, wherein the third operator is located within the operator group and the fourth operator is located within a second operator group hosted on a second host computer, wherein the second communication mode includes a point-to-point connection or a connection with a message broker.

7. The apparatus of claim 6, wherein the second communication mode is further based on a popularity of the second data stream.

8. The apparatus of claim 7, wherein the second communication mode is a point-to-point connection when the popularity of the second data stream fails to satisfy a popularity threshold or a connection with a message broker when the popularity of the second data stream satisfies the popularity threshold.

9. An apparatus, comprising:
at least one processor; and
at least one memory including computer program code;
wherein the at least one memory and the computer program code are configured to, with the at least one processor, cause the apparatus to at least:
determine, by a broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform, wherein the operator group is hosted on a host computer, wherein the first operator is located within the operator group and the second operator is located within a second operator group hosted on a second host computer, wherein the communication mode is based on a popularity of the data stream, wherein the communication mode is a point-to-point connection when the popularity of the data stream fails to satisfy a popularity threshold or a connection with a message broker when the popularity of the data stream satisfies the popularity threshold; and
support, by the broker based on the communication mode, communication of the data of the data stream between the first operator and the second operator.

10. The apparatus of claim 1, wherein, to determine the communication mode, the at least one memory and the computer program code are configured to, with the at least one processor, cause the apparatus to at least:
receive, by the broker from a platform controller of the stream processing platform, an instruction associated with the data stream; and
determine, by the broker based on the instruction associated with the data stream, the communication mode for communication of the data of the data stream.

11. An apparatus, comprising:
at least one processor; and
at least one memory including computer program code;
wherein the at least one memory and the computer program code are configured to, with the at least one processor, cause the apparatus to at least:
determine, by a broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform, wherein, to determine the communication mode, the at least one memory and the computer program code are configured to, with the at least one processor, cause the apparatus to at least:
determine, by the broker based on communications by the broker with at least one other broker, information indicative of network quality; and
determine, by the broker based on the information indicative of network quality, the communication mode for communication of the data of the data stream; and
support, by the broker based on the communication mode, communication of the data of the data stream between the first operator and the second operator.

12. The apparatus of claim 1, wherein, to determine the communication mode, the at least one memory and the computer program code are configured to, with the at least one processor, cause the apparatus to at least:
determine, by the broker, additional information including at least one of a characteristic of the data stream, a characteristic the first operator, a characteristic of the second operator, or a system constraint of the stream processing platform; and
determine, by the broker based on the additional information, the communication mode for communication of the data of the data stream.

13. The apparatus of claim 1, wherein, to support communication of data of the data stream between the first operator and the second operator, the at least one memory and the computer program code are configured to, with the at least one processor, cause the apparatus to at least:
send the data of the data stream based on the communication mode or receive the data of the data stream based on the communication mode.

14. The apparatus of claim 1, wherein, to support communication of data of the data stream between the first operator and the second operator, the at least one memory and the computer program code are configured to, with the at least one processor, cause the apparatus to at least:
support a finite state machine configured to control a communication state of the first operator of the stream processing platform.

15. The apparatus of claim 1, wherein the at least one memory and the computer program code are configured to, with the at least one processor, cause the apparatus to at least:
support establishment of point-to-point communications based on a communications protocol, wherein the communications protocol is optimized for the point-to-point communications.

16. The apparatus of claim 1, wherein the at least one memory and the computer program code are configured to, with the at least one processor, cause the apparatus to at least:
determine, by the broker, a second communication mode for communication of the data of the data stream between the first operator and a third operator of the stream processing platform, wherein the communication mode and the second communication mode are different; and
support, by the broker based on the second communication mode, communication of the data of the data stream between the first operator and the third operator.

17. The apparatus of claim 1, wherein the at least one memory and the computer program code are configured to, with the at least one processor, cause the apparatus to at least:
  support an application programming interface configured to support communication between the broker and a platform controller of the stream processing platform.

18. An apparatus, comprising:
  at least one processor; and
  at least one memory including computer program code;
  wherein the at least one memory and the computer program code are configured to, with the at least one processor, cause the apparatus to at least:
    determine, by a broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform;
    support, by the broker based on the communication mode, communication of the data of the data stream between the first operator and the second operator; and
    support at least one of an application programming interface configured to support communication between the broker and a platform controller of the stream processing platform or an application programming interface configured to support communication between the broker and a second broker associated with a second operator group including the second operator.

19. A method, comprising:
  determining, by a broker associated with an operator group of a stream processing platform, a communication mode for communication of data of a data stream between a first operator of the stream processing platform and a second operator of the stream processing platform, wherein the communication mode is based on relative locations of the first operator and the second operator within the stream processing platform, wherein the first operator and the second operator are co-located within the operator group, wherein the communication mode includes a shared queue of the broker; and
  supporting, by the broker based on the communication mode, communication of the data of the data stream between the first operator and the second operator.

* * * * *